US010999365B2

(12) United States Patent
Watanabe et al.

(10) Patent No.: US 10,999,365 B2
(45) Date of Patent: *May 4, 2021

(54) NETWORK COMMUNICATION SYSTEM, COMMUNICATION CONTROL APPARATUS, AND RECORDING MEDIUM

(71) Applicant: Ricoh Company, Ltd., Tokyo (JP)

(72) Inventors: Kiwamu Watanabe, Kanagawa (JP); Hiroshi Ota, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 461 days.

This patent is subject to a terminal disclaimer.

(21) Appl. No.: 15/724,437

(22) Filed: Oct. 4, 2017

(65) Prior Publication Data

US 2018/0103092 A1 Apr. 12, 2018

(30) Foreign Application Priority Data

Oct. 7, 2016 (JP) .............................. JP2016-199287

(51) Int. Cl.
*H04L 29/08* (2006.01)
*H04L 29/12* (2006.01)
(Continued)

(52) U.S. Cl.
CPC ...... *H04L 67/1059* (2013.01); *H04L 61/2514* (2013.01); *H04L 61/2517* (2013.01);
(Continued)

(58) Field of Classification Search
CPC ............. H04L 61/2557; H04L 61/2514; H04L 67/1059; H04L 61/2517; H04L 69/16; H04L 67/04; H04W 76/25; H04W 76/16
See application file for complete search history.

(56) References Cited

U.S. PATENT DOCUMENTS

| 10,572,202 B2* | 2/2020 | Ota .................. H04L 67/04 |
| 2004/0010562 A1* | 1/2004 | Itonaga ............... H04L 12/4645 709/213 |

(Continued)

FOREIGN PATENT DOCUMENTS

| JP | 2005-538585 | 12/2005 |
| JP | 2006-311527 | 11/2006 |

(Continued)

OTHER PUBLICATIONS

U.S. Appl. No. 15/726,885, filed Oct. 6, 2017, Hiroshi Ota, et al.

(Continued)

*Primary Examiner* — Oanh Duong
(74) *Attorney, Agent, or Firm* — Xsensus LLP

(57) ABSTRACT

A communication control apparatus for controlling communication between at least one communication apparatus and a plurality of network apparatuses residing on a plurality of networks includes a plurality of communication controllers respectively provided for the plurality of networks. Each communication controller includes a memory that stores operation determination information to be used for determining processing to be performed on transmission-and-reception information, the transmission-and-reception information to be transmitted or received by the communication controller with respect to other communication controller or one of the plurality of network apparatuses on the plurality of networks and circuitry that acquires the operation determination information in response to receiving the transmission-and-reception information and performs operation corresponding to the acquired operation determination information on the transmission-and-reception information, and a tag processor to add or remove tag information to or from the transmission-and-reception information.

9 Claims, 11 Drawing Sheets

(51) Int. Cl.
  *H04L 29/06*   (2006.01)
  *H04W 76/25*   (2018.01)
  *H04W 76/16*   (2018.01)

(52) U.S. Cl.
  CPC .......... *H04L 61/2557* (2013.01); *H04L 67/04* (2013.01); *H04L 69/16* (2013.01); *H04W 76/16* (2018.02); *H04W 76/25* (2018.02)

(56) References Cited

U.S. PATENT DOCUMENTS

| | | | | |
|---|---|---|---|---|
| 2005/0190788 | A1* | 9/2005 | Wong | H04L 12/4641 370/466 |
| 2006/0259583 | A1* | 11/2006 | Matsuura | H04L 61/256 709/218 |
| 2011/0268121 | A1* | 11/2011 | Karino | H04L 12/4633 370/392 |
| 2012/0329428 | A1* | 12/2012 | Hasegawa | H04L 63/0892 455/411 |

FOREIGN PATENT DOCUMENTS

| | | |
|---|---|---|
| JP | 2013-005415 A | 1/2013 |
| JP | 2013-105308 | 5/2013 |
| WO | WO2003/098880 A1 | 11/2003 |
| WO | WO2004/023724 A1 | 3/2004 |

OTHER PUBLICATIONS

Keisuke Nishida, [L2 switch + VLAN] Introduction of network virtualization, virtualization introduction guide to development environment, WEB+DB PRESS vol. 53, https://gihyo.jp/admin/column/01/vm/2009/l2-vlan?page=2, Nov. 16, 2009, with partial translation, 11 pages.

Office Action dated Jun. 16, 2020 in Japanese Patent Application No. 2016-199287, 5 pages.

Keisuke Nishida, [L2 switch + VLAN] Introduction of network virtualization, virtualization introduction guide to development environment, WEB+DB Press vol. 53, https://gihyo.jp/admin/column/01/vm/2009/l2-vlan?page=2, Nov. 16, 2009, with partial translation, 11 pages.

* cited by examiner

ND RECORDING MEDIUM

NETWORK COMMUNICATION SYSTEM, COMMUNICATION CONTROL APPARATUS, AND RECORDING MEDIUM

CROSS-REFERENCE TO RELATED APPLICATION

This patent application is based on and claims priority pursuant to 35 U.S.C. § 119(a) to Japanese Patent Application No. 2016-199287, filed on Oct. 7, 2016 in the Japan Patent Office, the entire disclosure of which is hereby incorporated by reference herein.

BACKGROUND

Technical Field

The present invention relates to a network communication system, a communication control apparatus, and a non-transitory recording medium storing a communication control program.

Background Art

Nowadays, in government and public offices and hospitals etc., multiple types of network including, for example, a network for communicating highly confidential information such as personal information (data) and a network for communicating less confidential information such as administrative information are used depending on a type of information. In addition, each department may be using a different type of network even if the departments belong to the same company, or reside on the same floor in the same building.

Here, if an image forming apparatus such as a multifunction peripheral (MFP) or a printer etc. is set up for each network, management cost rises. Especially, it is not cost-effective to set up multiple image forming apparatuses on the same floor because they occupy more space on the floor. Therefore, it is desired to have one image forming apparatus capable of connecting multiple types of network.

SUMMARY

Example embodiments of the present invention provide a novel communication control apparatus for controlling communication between at least one communication apparatus and a plurality of network apparatuses residing on a plurality of networks includes a plurality of communication controllers respectively provided for the plurality of networks. Each communication controller includes a memory that stores operation determination information to be used for determining processing to be performed on transmission-and-reception information, the transmission-and-reception information to be transmitted or received by the communication controller with respect to other communication controller or one of the plurality of network apparatuses on the plurality of networks and circuitry that acquires the operation determination information in response to receiving the transmission-and-reception information and performs operation corresponding to the acquired operation determination information on the transmission-and-reception information, and a tag processor to add or remove tag information to or from the transmission-and-reception information. When the transmission-and-reception information added with the tag information is received via one of the plurality of networks requiring the tag information, the tag processor transfers the transmission-and-reception information from which the tag information is removed to one of the plurality of communication controllers. When the transmission-and-reception information having no tag information is received from one of the plurality of communication controllers, the tag processor transfers the transmission-and-reception information added with the tag information to the one network requiring the tag information.

Further example embodiments of the present invention provide a network communication system and a non-transitory recording medium storing a communication control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

Figure 1:
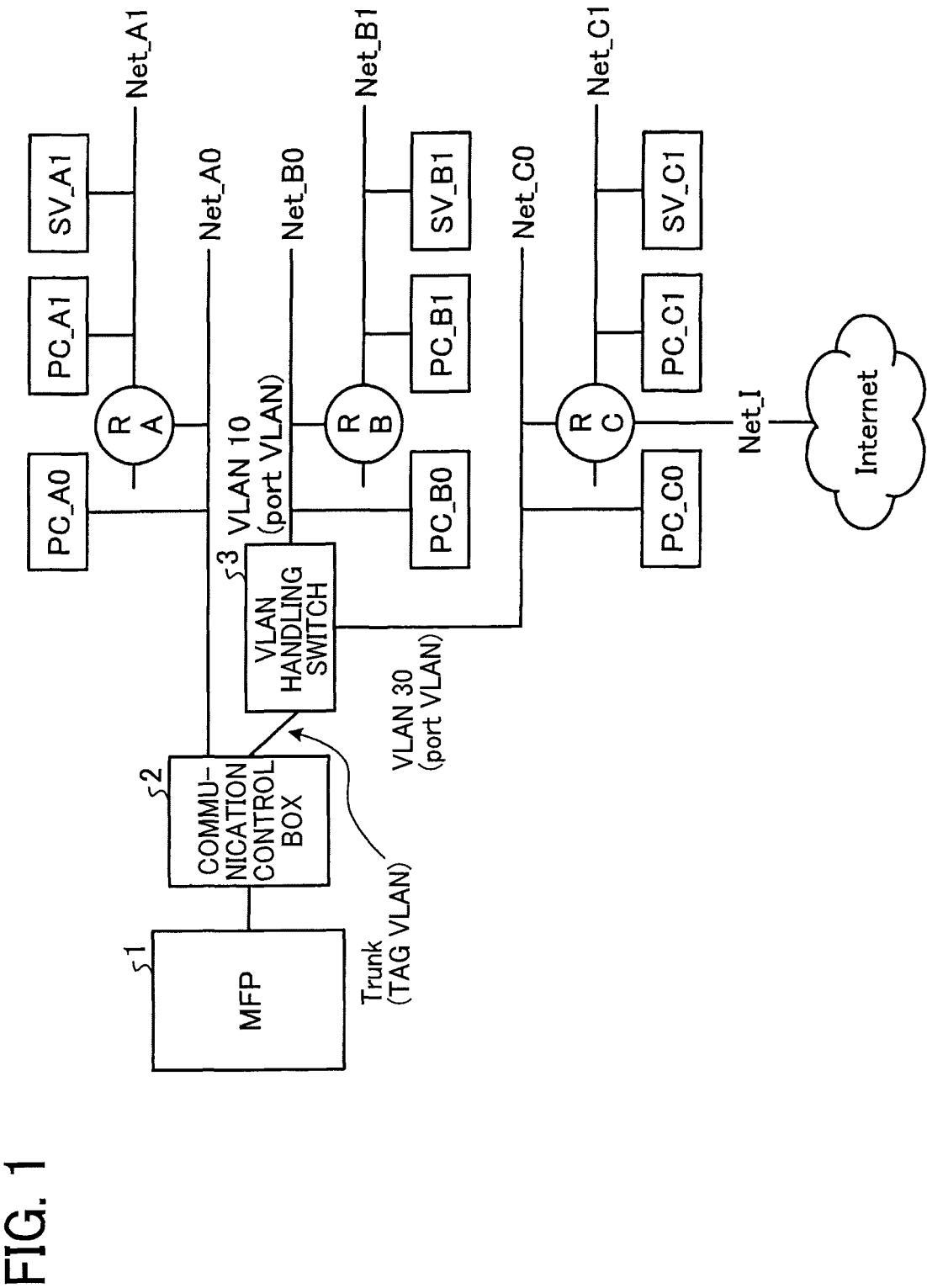
FIG. 1 is a diagram illustrating a configuration of a network communication system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Exemplary embodiments of this disclosure are now described below with reference to the accompanying drawings.

A network communication system in this embodiment is described below. In the network communication system in this embodiment, assuming that a router apparatus is laid out in multiple networks, routing to a network other than the network connected directly is also controlled. As a result, it is possible to perform communication via the router apparatus among multiple networks separated so that the networks cannot communicate with each other and utilize an image forming apparatus such as a MFP etc. in the large network. The network communication system in this embodiment may support a so-called tag VLAN by adding/removing tag information from/to packet information transferred to and received from a specific network by the tag processor.

First, FIG. 1 is a diagram illustrating a configuration of the network communication system in this embodiment. As illustrated in FIG. 1, the network communication system in this embodiment includes a MFP 1, a communication control box 2, a virtual local area network (VLAN such as IEEE 802.1Q etc.) supporting switch 3, and multiple networks Net_A0 to Net_C0, Net_A1 to Net_C1, and Net_I. Here, the MFP 1 is an example of a communication apparatus. However, any apparatus that can perform network communication may be used as the MFP 1. In addition, in this embodiment, the MFP 1, the communication control box 2, and the VLAN handling switch 3 are illustrated as physically separated apparatuses. However, for example, the communication control box 2 and the VLAN handling switch 3 may be included in the MFP 1, the VLAN handling switch 3 may be included in the communication control box 2, and it is possible to integrate all of or a part of the MFP 1, the communication control box 2, and the VLAN handling switch 3. In addition, for example, the communication control box 2 may be implemented as an extension board of the MFP 1.

The MFP 1 is connected to the network Net_A0 via the communication control box 2. In addition, the MFP 1 is connected to each of the networks Net_B0 and Net_C0 via the communication control box 2 and the VLAN handling switch 3. That is, in the VLAN handling switch 3, a port corresponding to the VLAN 10 is connected to the network Net_B0, and a port corresponding to the VLAN 30 is connected to the network Net_C0. In addition, a trunk port (Trunk) of the VLAN handling switch 3 is connected to the communication control box 2. It should be noted that a network interface of the MFP 1 has MAC address 00-00-5E-00-53-22.

The networks Net_A0, Net_B0, and Net_C0 are connected to the networks Net_A1, Net_B1, and Net_C1 via routers R_A, R_B, and R_C respectively. The network Net_I is connected to the networks Net_C0 and Net_C1 via the router R_C. The networks Net_C0 and Net_C1 are connected to the Internet via the router R_C and the network Net_I. Here, in this embodiment, the networks Net_A and Net_B cannot be connected to the Internet in consideration of communication security. However, it is possible to connect the networks Net_A and Net_B to the Internet.

Here, the networks connected to the MFP 1 are divided into a group Net_A including the networks Net_A0 and Net_A1, a group Net_B including the networks Net_B0 and Net_B1, and a group Net_C including the networks Net_C0, Net_C1, and Net_I. Those groups are separated from each other so that Internet Protocol communication cannot be performed. Here, in this embodiment, it is assumed that the network groups are separated so that IP communication cannot be performed between the different network systems. However, in accordance with security requisite etc., it is possible to perform communication between different network systems.

A personal computer (PC) PC_A0 is connected to the network Net_A0, a PC PC_B0 is connected to the network Net_B0, and a PC PC_C0 is connected to the network Net_C0 respectively. A PC PC_A1 and a server apparatus SV_A1 as examples of network apparatuses are connected to the network Net_A 1. A PC PC_B1 and a server apparatus SV_B1 as examples of network apparatuses are connected to the network Net_B1. A PC PC_C1 and a server apparatus SV_C1 are connected to the network Net_C1.

Each PC such as the PC PC_A1 etc. requests the MFP 1 to print and transfers apparatus information to the MFP 1 using Simple Network Management Protocol (SNMP). The MFP 1 transfers file information generated by scanning a document to the server apparatus SV_A1 etc. Here, request for print, transferring apparatus information using SNMP, and transferring file information generated by scanning a document are just examples, and other communication can also be performed.

The communication control box 2 restricts communication among network groups Net_A, Net_B, and Net_C and enables communication between the network Net_A and the MFP 1, the network Net_B and the MFP 1, and the network Net_C and the MFP 1.

The VLAN handling switch 3 adds/removes a VLAN tag "10" (VLAN ID) from/to the packet information transferred/received via the network Net_B0 connected to the port corresponding to the VLAN 10. In addition, the VLAN handling switch 3 adds/removes a VLAN tag "30" (VLAN ID) from/to the packet information transferred/received via the network Net_C0 connected to the port corresponding to the VLAN 30.

Next, example network addresses of the networks are described in Table 1 illustrated below.

TABLE 1

| Apparatus | Network address/netmask | VLAN | Description |
|---|---|---|---|
| Net_A0 | 192.168.1.0/24 | — | |
| Net_A1 | 192.168.10.0/24 | — | |
| Net_B0 | 172.16.1.0/24 | 10 | |
| Net_B1 | 172.16.10.0/24 | — | |
| Net_C0 | 10.0.1.0/24 | 30 | |
| Net_C1 | 10.0.10.0/24 | — | |
| Net_I | 203.0.113.0/29 | — | Segment for going out to the Internet |

As described in Table 1, the network address of the network Net_A0 is set to "192.168.1.0/24". Network address of the network Net_A1 is set to "192.168.10.0/24". Network address of the network Net_B0 is set to "172.16.1.0/24". Network address of the network Net_B1 is set to "172.16.10.0/24". Network address of the network Net_C0 is set to "10.0.1.0/24". Network address of the network Net_C1 is set to "10.0.10.0/24". Network address of the network Net_I is set to "203.0.113.0/29". In addition, a VLAN tag corresponding to the network Net_B0 is "10", and a VLAN tag corresponding to the network Net_C0 is "30". It should be noted that the network Net_I includes a segment for connecting to the Internet.

As described in Table 1, the network addresses of the networks are configured so that the network addresses do not overlap. Actually, in other cases, other network addresses can be configured so that IP addresses of the MFP 1 and the server apparatus that communicates with the MFP 1 directly does not overlap. Even if the IP address of the server apparatus that communicates with the MFP 1 directly overlaps, the configuration can be made so that static Network Address Port Translation is set.

Next, IP addresses and settings of the whole system are described in Table 2 below.

TABLE 2

| Apparatus | IP address/netmask | default gateway | Description |
|---|---|---|---|
| MFP | 192.168.1.10/24 | 192.168.1.1/24 | MFP |
| PC_A0 | 192.168.1.100/24 | 192.168.1.1/24 | |
| R_A | 192.168.1.1/24<br>192.168.10.1/24 | — | Router |
| PC_A1 | 192.168.10.100/24 | 192.168.10.1/24 | |
| SV_A1 | 192.168.10.11/24 | 192.168.10.1/24 | |
| PC_B0 | 172.16.1.100/24 | 172.16.1.1/24 | |
| R_B | 172.16.1.1/24<br>172.16.10.1/24 | — | Router |
| PC_B1 | 172.16.10.100/24 | 172.16.10.1/24 | |
| SV_B1 | 172.16.10.11/24 | 172.16.10.1/24 | |
| PC_C0 | 10.0.1.100/24 | 10.0.1.1/24 | |
| R_C | 10.0.1.1/24<br>10.0.10.1/24<br>203.0.113.2/29 | 203.0.113.1/29 | Router that may exchange packets with the Internet |
| PC_C1 | 10.0.10.100/24 | 10.0.10.1/24 | |
| SV_C1 | 10.0.10.11/24 | 10.0.10.1/24 | |

As described in Table 2, IP address of the MFP 1 is set to "192.168.1.10/24", and a default gateway is set to "192.168.1.1/24". IP address of the PC PC_A0 is set to "192.168.1.100/24", and a default gateway is set to "192.168.1.1/24". IP address of the router R_A is set to "192.168.1.1/24", and a subnet mask is set to "192.168.10.1/24".

IP address of the PC PC_A1 is set to "192.168.10.100/24", and a default gateway is set to "192.168.10.1/24". IP address of the server apparatus SV_A1 is set to "192.168.10.11/24", and a default gateway is set to "192.168.10.1/24". IP address of the PC PC_B0 is set to "172.16.1.100/24", and a default gateway is set to "172.16.1.1/24".

IP address of the router R_B is set to "172.16.1.1/24", and a subnet mask is set to "172.16.10.1/24". IP address of the PC PC_B1 is set to "172.16.10.100/24", and a default gateway is set to "172.16.10.1/24". IP address of the server apparatus SV_B1 is set to "172.16.10.11/24", and a default gateway is set to "172.16.10.1/24". IP address of the PC PC_C0 is set to "10.0.1.100/24", and a default gateway is set to "10.0.1.1/24".

IP addresses of the router R_C that may transfer packet information (an example of transmission-and-reception information) to the Internet are set to "10.0.1.1/24" and "10.0.10.1/24", subnet mask of the router R_C is set to "203.0.113.2/29", and default gateway of the router R_C is set to "203.0.113.1/29". IP address of the PC PC_C1 is set to "10.0.10.100/24", and a default gateway is set to "10.0.10.1/24". IP address of the server apparatus SV_C1 is set to "10.0.10.11/24", and a default gateway is set to "10.0.10.1/24".

As described in Table 2 above, one IP address that enables to perform communication via the network is allocated to each PC and server apparatus. In order to enable to perform communication via the connected networks, multiple IP addresses are allocated to the router. In laying out one server apparatus and router logically, it is possible to implement the server apparatus and the router using multiple apparatuses redundantly.

Figure 2:
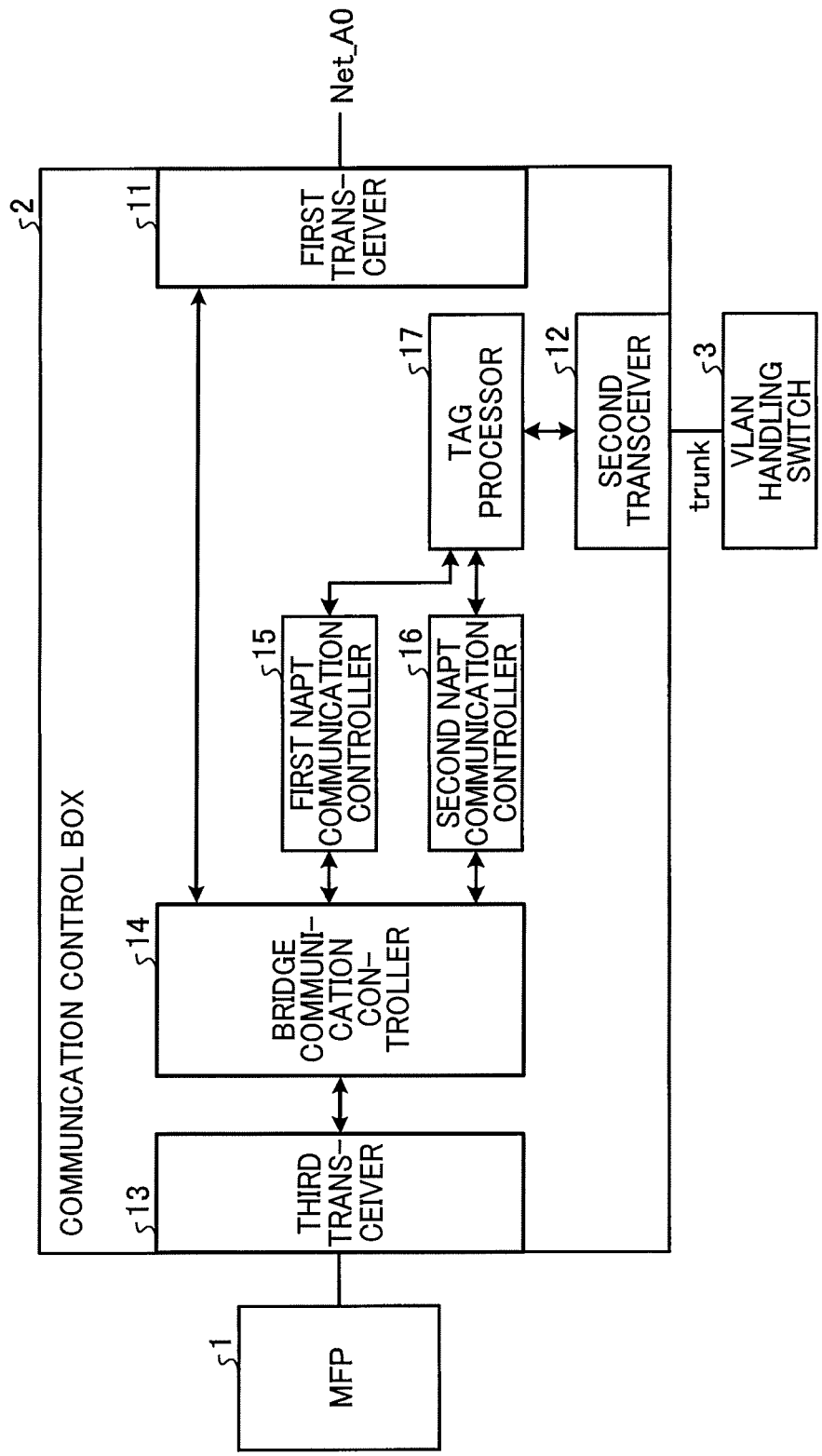
FIG. 2 is a block diagram illustrating a functional configuration of a communication control box as an embodiment of the present invention.

FIG. 2 is a block diagram illustrating a functional configuration of the communication control box 2 in this embodiment implemented by executing a network control program stored in a read only memory (ROM), a random access memory (RAM), or a hard disk drive (HDD) by a central processing unit (CPU) included in a controller of the communication control box 2. That is, the CPU in the communication control box 2 implements a first transmitter-and-receiver 11, a second transmitter-and-receiver 12, a third transmitter-and-receiver 13, a bridge communication controller 14, a first Network Address Port Translation (NAPT) communication controller 15 (corresponding to the Net_A0 and Net_A1), a second NAPT communication controller 16 (corresponding to the Net_B0 and Net_B1), and a tag processor 17 (corresponding to the Net_C0 and Net_C1) by executing the network control program. The bridge communication controller 14, the first NAPT communication controller 15, and the second NAPT communication controller 16 are examples of the communication controller. In addition, the tag processor 17 is an example of a tag information (data) processor.

Here, the components from the first transmitter-and-receiver 11 to the tag processor 17 described above are implemented by using software. However, all of the components or a part of the components may be implemented by hardware such as an integrated circuit (IC) etc.

In addition, the network control program may be provided by being stored in a computer readable, recording medium, such as a compact disc read only memory (CD-ROM) and a flexible disk (FD) in a file format installable to or executable by a general-purpose computer. In addition, the network control program may be provided by being stored in a computer readable, recording medium, such as a compact disc recordable (CD-R), a digital versatile disc (DVD), a Blu-ray (registered trademark) disc, and a semiconductor memory etc. In addition, the network control program may be downloaded for installation via a network such as the Internet etc. In addition, the network control program may be provided by being preliminarily installed in the ROM included in the apparatus.

The transmitter-and-receivers 11 to 13 each receive packet information transferred via the network and transfer the packet information via the network. Examples of the transmitter-and-receivers 11 to 13 are a network interface for performing Ethernet (registered trademark) communication, an interface corresponding to a PCI express card, and a Universal Serial Bus (USB) interface etc.

The bridge communication controller 14 determines a destination of the packet information received via the transmitter-and-receivers 11 to 13 and overwrites the packet information etc. The NAPT communication controllers 15 and 16 each determine a destination of the packet information received via the transmitter-and-receivers 11 to 13 and overwrite the packet information etc. The NAPT communication controllers 15 and 16 each include a NAPT table for performing NAPT operation and convert IP addresses and port numbers using the NAPT table (performing NAPT operation). Each of the first NAPT communication controller 15 and the second NAPT communication controller 16 includes an independent routing table.

It should be noted that, in the NAPT communication controllers 15 and 16, network resources such as a routing table, a NAPT table, and a session table (for managing a source port and a destination port for TCP/UDP communication) etc. are provided individually. That is, the NAPT communication controllers 16 and 17 use network resources that are respectively provided independent from each other.

The tag processor 17 adds VLAN tag "10" to packet information transferred via the network Net_B0 and removes VLAN tag "10" from packet information received via the network Net_B0. The tag processor 17 adds VLAN tag "30" to packet information transferred via the network Net_C0 and removes VLAN tag "30" from packet information received via the network Net_C0.

Figure 3:
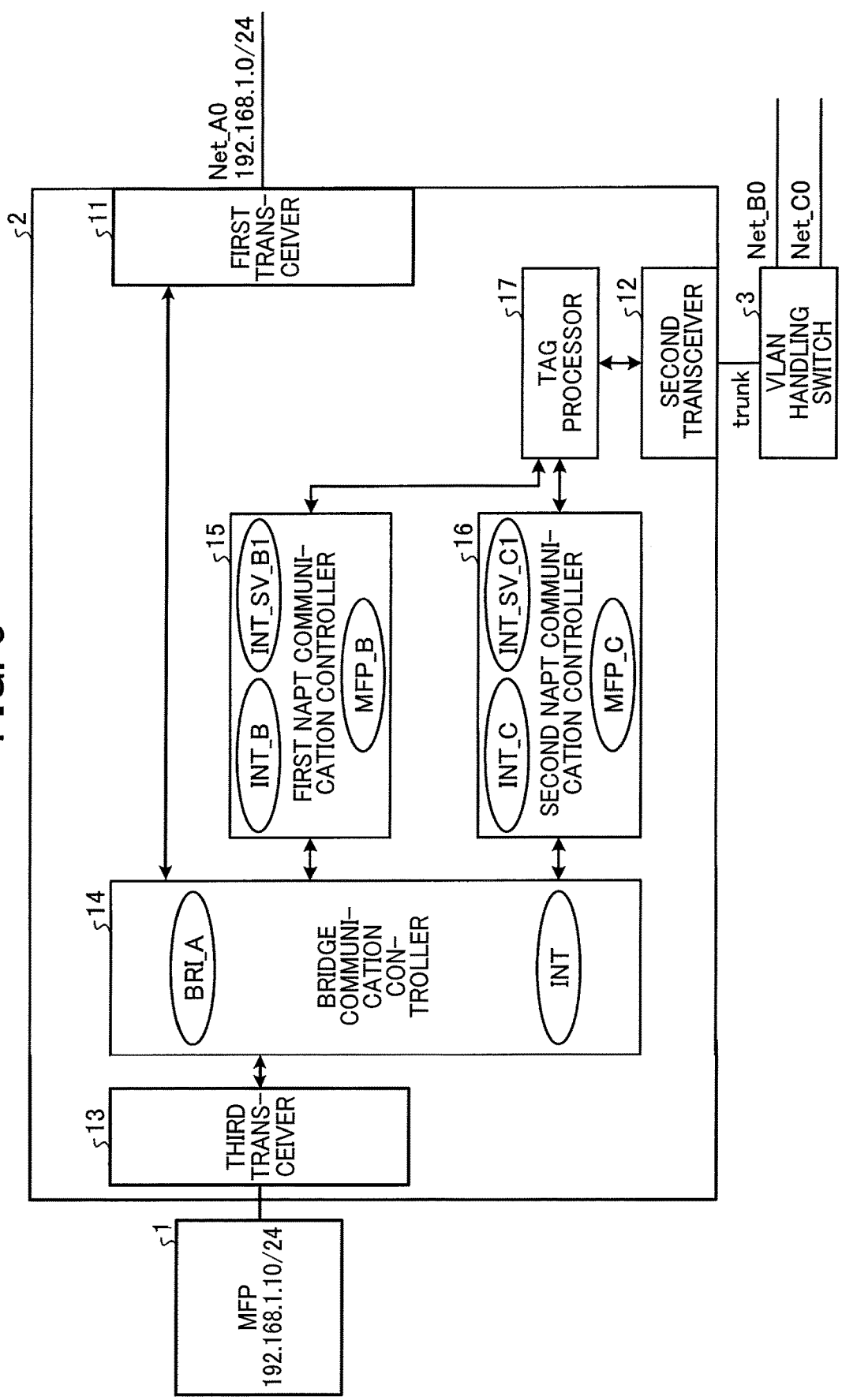
FIG. 3 is a diagram illustrating IP addresses of units in the communication control box as an embodiment of the present invention.

IP addresses of the bridge communication controller 14, the first NAPT communication controller, and the second NAPT communication controller are illustrated in FIG. 3 and Table 3 as described below.

TABLE 3

| Apparatus | IP address/netmask | Description |
|---|---|---|
| BRI_A | 192.168.1.11/24 | IP address as a source in transferring a packet received from the first and second transmitter-and-receivers to the MFP |
| INT | 192.168.2.10/24 | IP address as a source in transferring a packet received from the MFP to the first and second transmitter-and-receivers used within the communication control box only and not be used in the network |
| INT_B | 192.0.2.12/24 | TP address as a source in transferring a packet received from the third transmitter-and-receiver to the bridge communication controller used within the communication control box only and not be used in the network |
| INT_C | 192.0.2.13/24 | IP address as a source in transferring a packet received from the third transmitter-and-receiver to the bridge communication controller used within the communication control box only and not be used in the network |
| MFP_B | 172.16.1.10/24 | IP address for accessing the MFP from the network group Net_B |
| INT_SV_B1 | 192.0.2.200/24 | IP address for transferring a packet received from the bridge communication controller to the SV_B in the network group Net_B used within the communication control box only. |
| MFP_C | 10.0.1.10/24 | IP address for accessing the MFP from the network group Net_C |
| INT_SV_C1 | 192.0.2.201/24 | IP address for transferring a packet received from the bridge communication controller to the SV_C in the network group Net_C used within the communication control box only. |

As illustrated in FIG. 3 and Table 3, the IP address BRI_A of the bridge communication controller 14 used in transferring the packet information received via the first transmitter-and-receiver 11 and the second transmitter-and-receiver 12 to the MFP 1 corresponds to "192.168.1.11/24". In addition, the IP address INT of the bridge communication controller 14 used only inside the communication control box 2 in transferring the packet information received from the MFP 1 to the first transmitter-and-receiver 11 and the second transmitter-and-receiver 12 corresponds to "192.0.2.10/24". Here, the IP address INT as "192.0.2.10/24" is not used in the networks.

The IP address INT_B of the first NAPT communication controller 15 used in transferring the packet information received via the first transmitter-and-receiver 11 to the bridge communication controller 14 corresponds to "192.0.2.12/24". The IP address IN'I'_B as "192.0.2.12/24" is not used in the networks either.

The IP address INT_C of the second NAPT communication controller 16 used in transferring the packet information received via the second transmitter-and-receiver 12 to the bridge communication controller 14 corresponds to "192.0.2.13/24". The IP address INT_B as "192.0.2.13/24" is not used in the networks either.

The IP address MFP_B of the first NAPT communication controller 15 for accessing the MFP 1 from the network group Net_B corresponds to "172.16.1.10/24". The IP address INT_SV_B1 of the first NAPT communication controller 15 used inside the communication control box 2 in transferring the packet information received from the bridge communication controller 14 to the server apparatus SV_B in the network group Net_B corresponds to "192.0.2.200/24".

The IP address MFP_C of the second NAPT communication controller 16 for accessing the MFP 1 from the network group Net . . . C corresponds to "10.0.1.10/24". The IP address INT_SV_C1 of the second NAPT communication controller 16 used inside the communication control box 2 in transferring the packet information received from the bridge communication controller 14 to the server apparatus SV_C in the network group Net_C corresponds to "192.0.2.201/24".

The IP address as "192.0.2.0/24" is reserved for documentation in Request For Comments (RFC) 5737 and is not used in the networks. In the network communication system in this embodiment, communication within the communication control box 2 is performed using the IP address "192.0.2.0/24" as an example. However, whichever IP address may be used within the communication control box 2 as long as the IP address does not overlap with IP addresses used in the networks.

Figure 4:
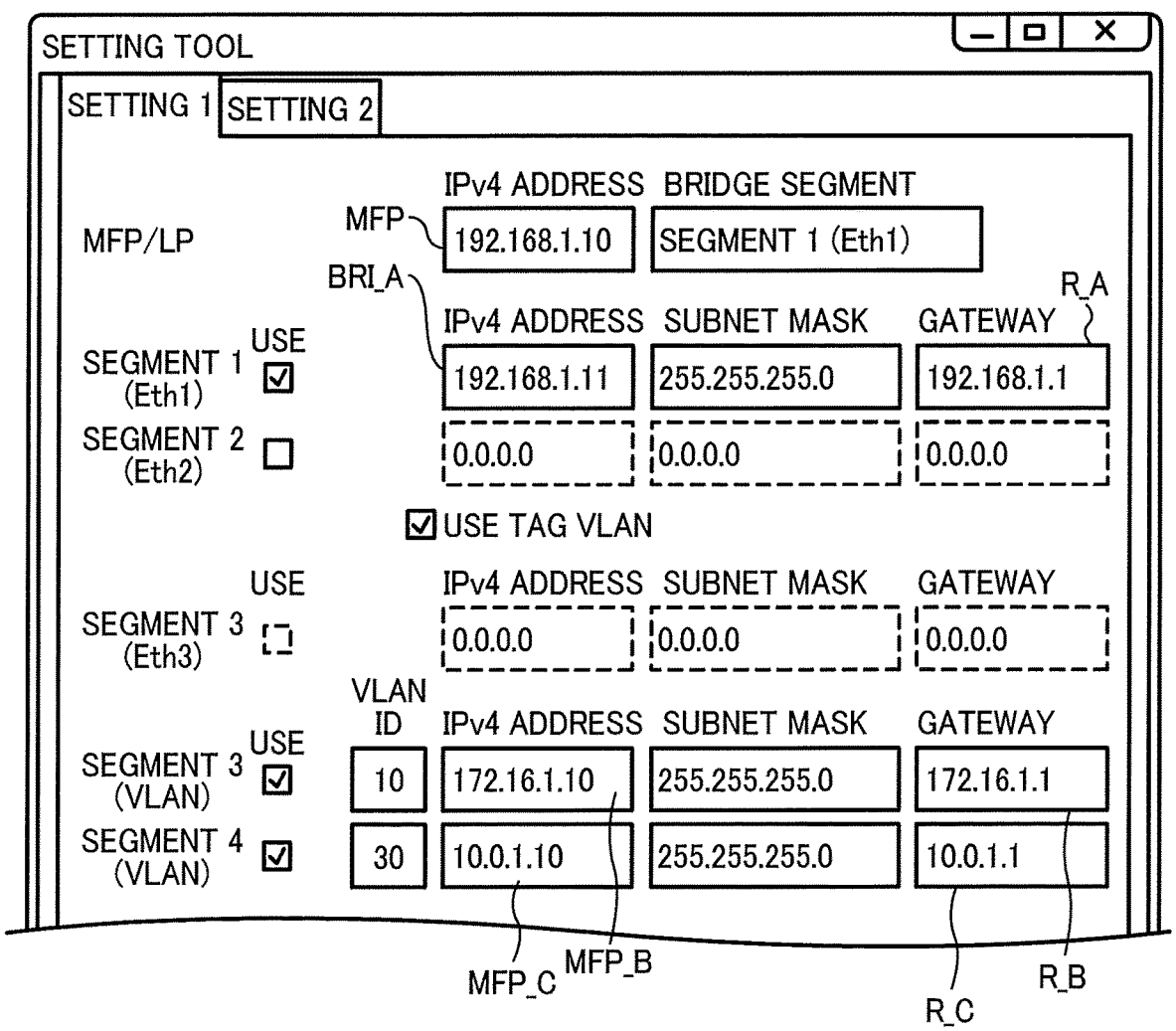
FIG. 4 is a diagram illustrating a basic setting screen of the communication control box as an embodiment of the present invention.

FIG. 4 is a diagram illustrating a basic setting screen of the communication control box in this embodiment. In FIG.

4, as a basic setting screen, an input box for IP address (in this case, Internet Protocol version 4 (IPv4) address or IPv6 address) of the MFP 1, an input box for a gateway such as the routers R_A to R_C etc., and an input box for IP address BRI_A of the bridge communication controller 14 etc. are included. In addition, as a basic setting screen, an input box for IP address MFP_B of the first NAPT communication controller 15 for accessing the MFP 1 from the network group Net_B and an input box for IP address MFP_C of the second NAPT communication controller 16 for accessing the MFP 1 from the network group Net_C are included.

Figure 5:
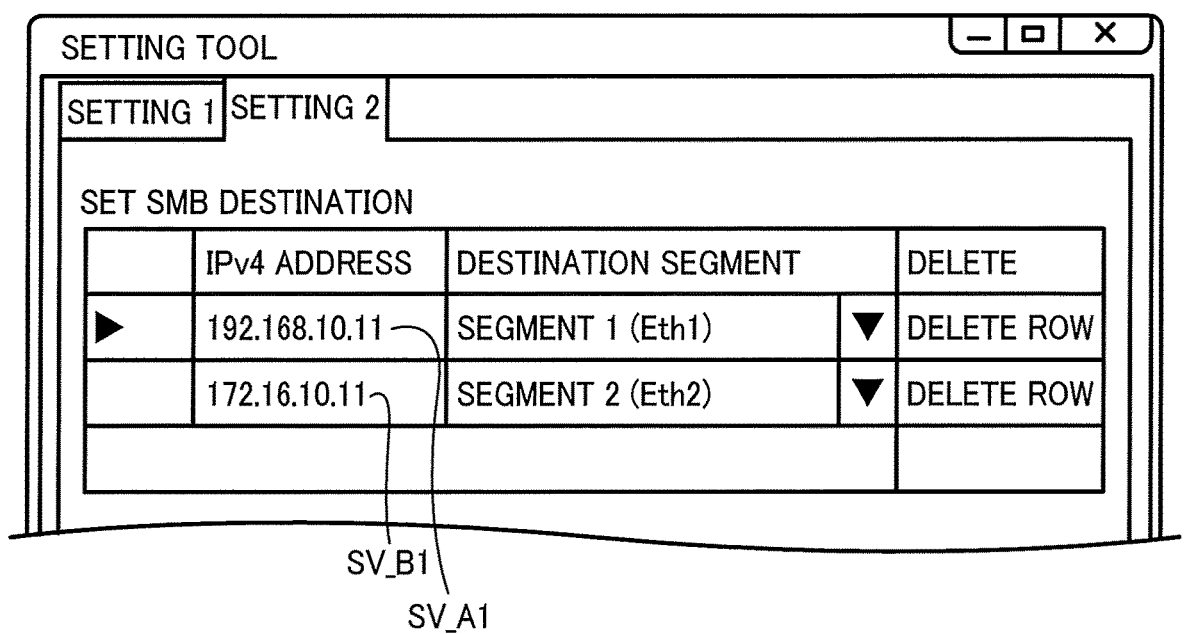
FIG. 5 is a diagram illustrating a server setting screen of the communication control box as an embodiment of the present invention.

FIG. 5 is a diagram illustrating a server setting screen of the communication control box in this embodiment. In FIG. 5, input boxes for IP addresses (IPv4 addresses) of the server apparatus SV_A1 located in the network group Net_A and the server apparatus SV_B1 located in the network group Net_B1 are included. The values input on the setting screens described above are used for controlling communication between apparatuses.

It should be noted that values such as IP address, netmask, and gateway address etc. may be acquired using Dynamic Host Configuration Protocol (DHCP). The MAC address of the router R_A is acquired from the IP address of the router R_A by the communication control box 2 from the IP address of the router R_A using Address Resolution Protocol as a communication protocol for acquiring MAC address of Ethernet (registered trademark) from IP address. Similarly, the MAC address of the MFP 1 is acquired using the IP address of the MFP. Of course, MAC address may be registered as is. It should be noted that it is possible to operate the system easily by managing the system using IP address compared to registering MAC address. In addition, it is possible to set up a screen for configuring access control list in the communication control box 2 and add access control using a black list and white list. In this case, it is possible to control access by using IP address and subnet mask and a destination port such as 161 and 9100 etc. for example, and it is possible to control access by using IP address and interfaces such as the first transmitter-and-receiver 11, the second transmitter-and-receiver 12, and the third transmitter-and-receiver 13 etc.

Figure 6:
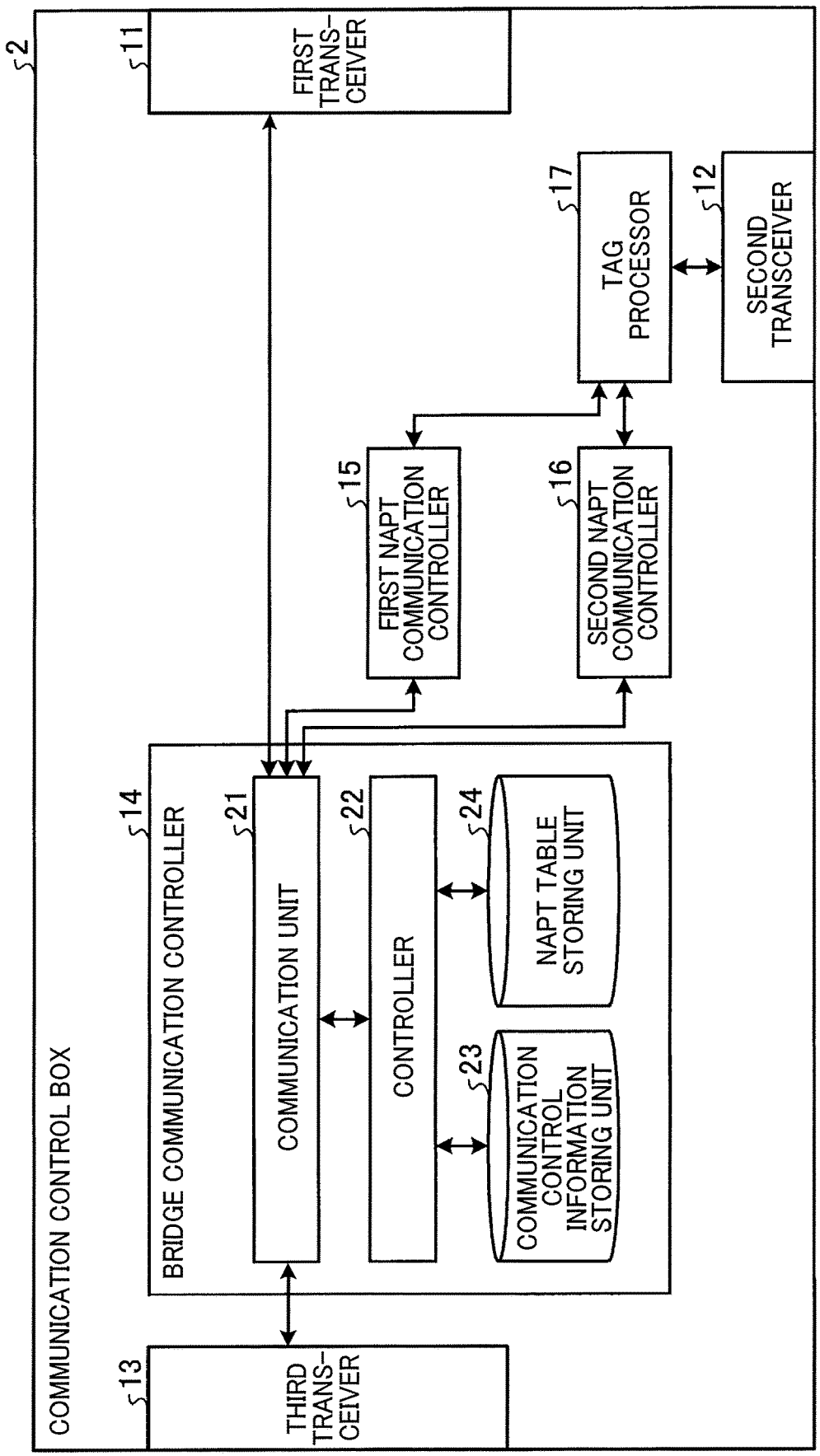
FIG. 6 is a diagram illustrating a configuration of a bridge communication controller as an embodiment of the present invention.

FIG. 6 is a diagram illustrating a configuration of the bridge communication controller 14 in this embodiment. As illustrated in FIG. 6, the bridge communication controller 14 includes a communication unit 21, a controller 22 (an example of an acquisition unit), a communication control information storing unit 23 (an example of a storing unit), and a NAPT table storing unit 24. The communication control information storing unit 23 and the NAPT table storing unit 24 are implemented in the storing unit such as the ROM and RAM etc. included in the bridge communication controller 14. By contrast, the communication unit 21 and the controller 22 are implemented using software by executing the network control program by the CPU in the bridge communication controller 14. It should be noted that both of the communication unit 21 and the controller 22 or either one of the communication unit 21 and the controller 22 may be implemented using hardware.

The controller 22 controls the communication unit 21 on the basis of communication control information stored in the communication control information storing unit 23. In accordance with the control by the controller 22, the communication unit 21 transfers the packet information received from the first transmitter-and-receiver 11, the second transmitter-and-receiver 12, and the third transmitter-and-receiver 13 and overwrites the packet information including NAPT operation.

Figure 7:
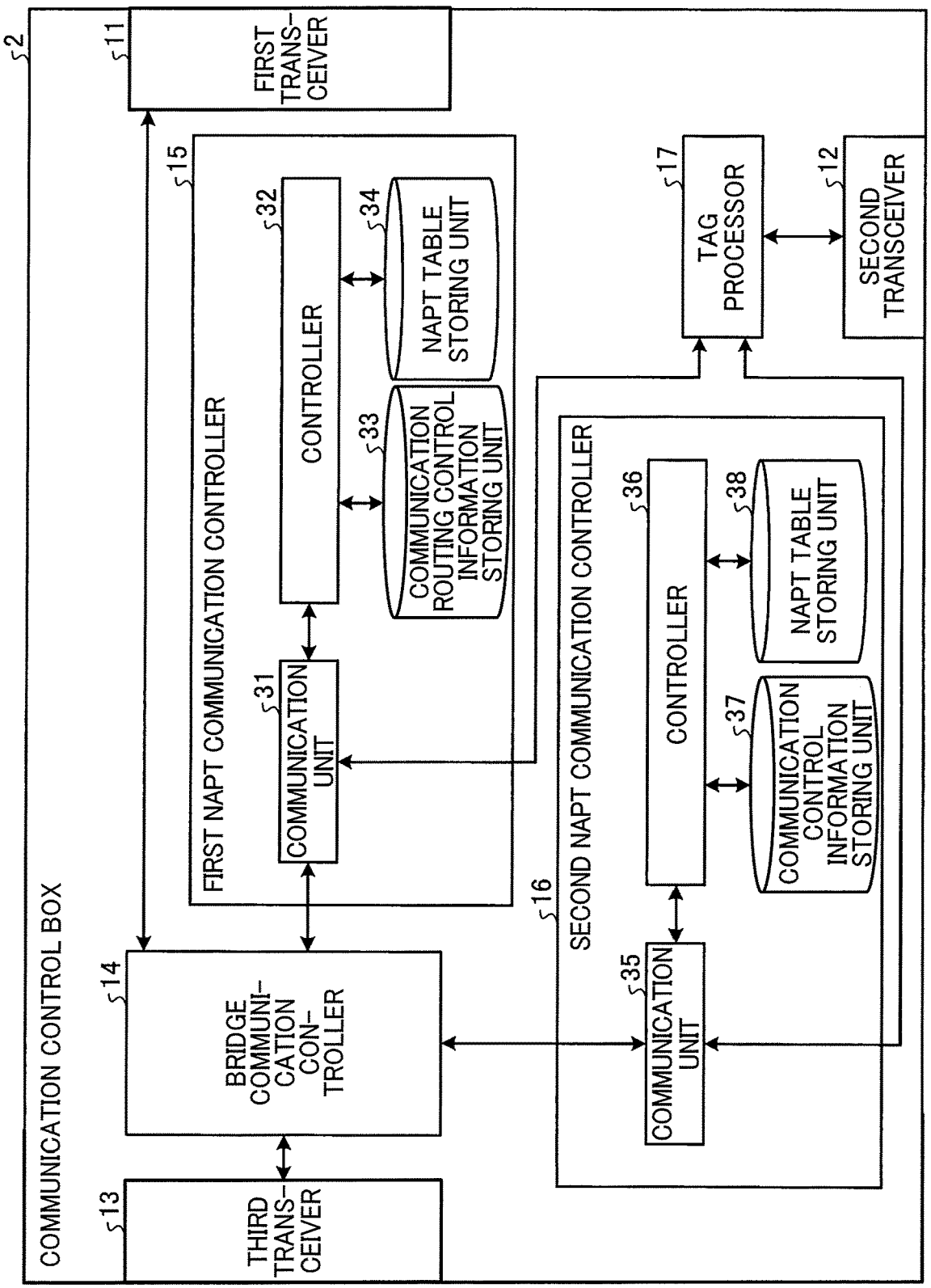
FIG. 7 is a diagram illustrating a configuration of a NAPT communication controller as an embodiment of the present invention.

FIG. 7 is a diagram illustrating a configuration of the first NAPT communication controller 15 and the second NAPT communication controller 16 in this embodiment. As illustrated in FIG. 7, the NAPT communication controllers 15 and 16 include communication units 31 and 35, controllers 32 and 36 (an example of an acquisition unit), communication routing control information storing units 33 and 37 (an example of a storing unit), and NAPT table storing units 34 and 38, respectively. The communication routing control information storing units 33 and 37 and the NAPT table storing units 34 and 38 are implemented in the storing unit such as the ROM and RAM etc. included in the first NAPT communication controller 15 and the second NAPT communication controller 16. By contrast, the communication units 31 and 35 and the controllers 32 and 36 are implemented using software by executing the network control program by the CPU in the NAPT communication controllers 15 and 16. It should be noted that all of the communication units 31 and 35 and the controllers 32 and 36 or a part of the communication units 31 and 35 and the controllers 32 and 36 may be implemented using hardware.

On the basis of communication routing control information stored in the communication routing control information storing units 33 and 37 and information stored in the NAPT table storing units 34 and 38, the controllers 32 and 36 control the communication units 31 and 35. In the communication routing control information storing units 33 and 37, control information for performing internal communication or external communication such as a flow table (with reference to Tables 7 and 8 described later) and an Address Resolution Protocol (ARP) table etc. are stored. In accordance with the control by the controllers 32 and 36, the communication units 31 and 35 transfer the packet information received from the first transmitter-and-receiver 11, the second transmitter-and-receiver 12, and the third transmitter-and-receiver 13 and overwrite the packet information including NAPT operation.

Each of the bridge communication controller 14, the first NAPT communication controller 15, and the second NAPT communication controller 16 includes an independent routing table. Table 4 described below is an example of the routing table stored in the NAPT table storing unit 34 included in the first NAPT communication controller 15.

TABLE 4

| Destination/netmask | Gateway |
| --- | --- |
| 0.0.0.0/0 | 172.16.1.1 [R_B] |

In Table 4, the default gateway corresponds to "172.16.1.1 [the router R_B]". In this case, only one gateway is configured. However, multiple routers may be configured in accordance with the configuration of the network.

Table 5 described below is an example of the routing table stored in the NAPT table storing unit 38 included in the second NAPT communication controller 16.

TABLE 5

| Destination/netmask | Gateway |
| --- | --- |
| 0.0.0.0/0 | 10.0.1.1 [R_C] |

In Table 5, the default gateway corresponds to "10.0.1.1 [the router R_C]". In this case, only one gateway is configured. However, multiple routers may be configured in accordance with the configuration of the network.

Each of the NAPT communication controllers 15 and 16 are implemented using Network Address Port Translator (NAPT). However, the NAPT communication controllers 15 and 16 may be implemented using Network Address Translator (NAT). In this case, there are two NAPT communication controllers, the first NAPT communication controller 15 and the second NAPT communication controller 16. However, more than three NAPT communication controllers may be implemented.

Next, Table 6 described below describes the flow table stored in the communication control information storing unit 23 included in the bridge communication controller 14.

TABLE 6

| | In port | Type | Source (src) | Destination (dst) | Action |
|---|---|---|---|---|---|
| 1 | First transmitter-and-receiver | IP | 192.0.2.0/24 | ANY | Drop |
| 2 | Third transmitter-and-receiver | IP | 192.0.2.0/24 | ANY | Drop |
| 3 | First transmitter-and-receiver | IP | ANY | ANY | Output (Third transmitter-and-receiver) |
| 4 | First NAPT communication controller | ANY | ANY | 192.0.2.10 [INT] | NAPT (SNAT, 192.168.1.11 [BRI_A]) NAPT (DNAT, 192.168.1.10 [MFP]) mod_mac (R_A) Output (Third transmitter-and-receiver) |
| 5 | Second NAPT communication controller | IP | ANY | 192.0.2.10 [INT] | NAPT (SNAT, 192.168.1.11 [BRI_A]) NAPT (DNAT, 192.168.1.10 [MFP]) mod_mac (R_A) Output (Third transmitter-and-receiver) |
| 6 | Third transmitter-and-receiver | IP | ANY | 172.16.10.11 [SV_B1] | NAPT (SNAT, 192.0.2.200 [INT_SV_B1]) NAPT (DNAT, 192.0.2.12 [INT_B]) Output (First transmitter-and-receiver) |
| 7 | Third transmitter-and-receiver | IP | ANY | 10.0.10.11 [SV_C1] | NAPT (SNAT, 192.0.2.201 [INT_SV_C1]) NAPT (DNAT, 192.0.2.13 [INT_C] Output (Second transmitter-and-receiver) |
| 8 | Third transmitter-and-receiver | ANY | ANY | ANY | Output (First transmitter-and-receiver) |
| Default | ANY | ANY | ANY | ANY | Drop |

In the flow table of the bridge communication controller 14, a rule of processing packets for the bridge communication controller 14 is described. The bridge communication controller 14 detects the rule of processing packets corresponding to the received packet information by scanning the rule of processing packets in the flow table sequentially from the top using the received packet information. Subsequently, the bridge communication controller 14 performs an operation (an action) corresponding to the received packet information indicated by the detected rule of processing packets. After performing the action, the bridge communication controller 14 finishes scanning the flow table.

As illustrated in Table 6, the rule of processing packets in the flow table includes conditions such as an input source (In port), type, source (src), destination (dst), and operation (action). The bridge communication controller 14 detects a rule of processing packets that the received packet information corresponds to the all conditions as the rule of processing packets corresponding to the received packet information. The condition "ANY" in Table 6 indicates that any packet information corresponds. If the received packet information does not correspond to any condition, the bridge communication controller 14 performs a default operation (discard:drop) described in the bottom row in Table 6.

The condition "input source (in port)" in Table 6 indicates the port that receives that packet information. More specifically, the first transmitter-and-receiver 11, the second transmitter-and-receiver 12, the third transmitter-and-receiver 13, the first NAPT communication controller 15, and the second NAPT communication controller 16 etc. described above correspond to the "input source (in port)". In Table 6, the condition "type" indicates a type of communication. More specifically, communication in data link layer and communication in network layer correspond to the condition. If the packet information is transferred using IP communication, the condition "type" corresponds to IP.

In Table 6, the condition "src (source)" indicates a source address. In addition, the condition "dst (destination)" indicates a destination address. More specifically, there are three cases, one IP address, network address, and MAC address regarding data link layer. By regarding MAC address as the condition of matching operation, it is possible to handle packet information from a specific apparatus as a target of NAPT operation, and it is possible to prevent inconvenience that packets are transferred from an unintended apparatus to the server apparatus SV_B1 or the server apparatus SV_C1. It should be noted that it is unnecessary that MAC address corresponds to the condition of matching operation.

In Table 6, "actions" indicates an operation when the packet information corresponds to each condition. It should be noted that the bridge communication controller 14 may perform multiple actions. Among the actions, "drop" indicates an operation that discards packet information. In addition, "NAPT" indicates that NAPT operation is performed. In case of detecting Source Network Address Translation (SNAT) as the first parameter of the packet information, the bridge communication controller 14 converts the source address (i.e., SNAT operation) as NAPT operation. In case of detecting Destination Network Address Translation (DNAT) as the first parameter of the packet information, the bridge communication controller 14 converts the destination address (i.e., DNAT operation) as NAPT operation. In each case, the second parameter corresponds to IP address to be replaced.

In performing NAPT operation described above, the bridge communication controller 14 overwrites the content of NAPT table so that NAPT operation may be performed correctly. In this case, the bridge communication controller 14 checks inappropriate TCP sessions and prevent inappropriate packets from being transferred.

Next, in Table 6, the action "mod_mac" indicates an operation of replacing MAC address. In Table 6, the action "output" indicates an operation of outputting packet information to a designated port. Here, a default operation of the bridge communication controller 14 is to discard (drop) all packet information.

In Table 6, as described using "1" and "2", if the source corresponds to IP address "192.0.2.0/24" used within the communication control box 2, the bridge communication controller 14 discards (drops) packet information. As a result, it is possible to prevent inconvenience that packet information whose IP address is used within the communication control box 2 is received from outside and unintended packet information is transferred.

In Table 6, as described using "3", any packet information (ANY) received via the first transmitter-and-receiver 11 is output to the third transmitter-and-receiver 13. In Table 6, as described using "4", packet information received via the first NAPT communication controller 15 is described. If the destination of the packet information is IP address "192.0.2.10 (INT)" of the bridge communication controller 14, the bridge communication controller 14 sets IP address BRI_A of the bridge communication controller 14 to the source address, sets the MFP to the destination address, sets MAC address of the router R_A to the source MAC address, and transfers the packet information to the third transmitter-and-receiver 13.

In Table 6, as described using "5", packet information received via the second NAPT communication controller 16 is described. If the destination of the packet information is IP address "192.0.2.10 (INT)" of the bridge communication controller 14, the bridge communication controller 14 sets IP address BRI_A of the bridge communication controller 14 to the source address, sets the MFP to the destination address, sets MAC address of the router R_A to the source MAC address, and transfers the packet information to the third transmitter-and-receiver 13.

In Table 6, as described using "6", if the destination of the packet information received via the third transmitter-and-receiver 13 (e.g., packet information generated by scanning a document) corresponds to the server apparatus SV_B1, the bridge communication controller 14 performs NAPT operation to convert the source to IP address of INT_SV_B1 in the server apparatus and convert the destination to IP address of INT_B in the first NAPT communication controller 15 and transfers the packet information to the first NAPT communication controller 15.

In Table 6, as described using "7", if the destination of the packet information received via the third transmitter-and-receiver 13 (e.g., packet information generated by scanning a document) corresponds to the server apparatus SV_C1, the bridge communication controller 14 performs NAPT operation to convert the source to IP address of INT_SV_C1 in the server apparatus and convert the destination to IP address of INT_C in the second NAPT communication controller 16 and transfers the packet information to the second NAPT communication controller 16.

In Table 6, as described using "8", an operation that the bridge communication controller 14 transfers any (i.e., "ANY") packet information received from the third transmitter-and-receiver 13 to the first transmitter-and-receiver 11. Basically, the bridge communication controller 14 enables communication between the first transmitter-and-receiver 11 and the third transmitter-and-receiver 13. For example, except a part of packet information such as packet information regarding internal communication, the first NAPT communication controller 15, and the second NAPT communication controller 16, the bridge communication controller 14 performs bridge operation.

Here, an order of the rule of processing packet in the flow table in Table 6 is determined in consideration of security, possibility of accordance, and operability of control for example. For example, in the network communication system in this embodiment, it is assumed that communication between the first transmitter-and-receiver 11 and the third transmitter-and-receiver 13 is performed most frequently. In this case, as the rule of processing packet scanned firstly on the flow table in Table 6, the rule of processing packet corresponding to communication between the first transmitter-and-receiver 11 and the third transmitter-and-receiver 13 is configured. In this example, the rule of processing packet whose possibility of accordance is higher is laid out sequentially from the top and scanned. As described above, in case of scanning the rule of processing packet sequentially from the rule of processing packet whose possibility of accordance is higher, it is possible to detect the corresponding rule of processing packet at higher speed.

Next, Table 7 described below describes the flow table stored in the communication routing control information storing unit 33 included in the first NAPT communication controller 15.

TABLE 7

| | In port | Type | Source (src) | Destination (dst) | Action |
|---|---|---|---|---|---|
| 1 | Second transmitter-and-receiver | IP | 192.0.2.0/24 | ANY | Drop |
| 2 | Second transmitter-and-receiver | IP | ANY | 172.16.1.10: 161 [MFP_B] | NAPT (SNAT, 192.0.2.12 [INT_B]) NAPT (DNAT, 192.0.2.10: 161 [INT]) Output (Bridge communication controller) |
| 3 | Second transmitter-and-receiver | IP | ANY | 172.16.1.10: 9100 [MFP_B] | NAPT (SNAT, 192.0.2.12 [INT_B]) NAPT (DNAT, 192.0.2.10: 9100 |

TABLE 7-continued

| In port | Type | Source (src) | Destination (dst) | Action |
|---|---|---|---|---|
| 4 | Bridge communication controller | IP | 192.0.2.200 [INT_SV_B1] | 192.0.2.12: 445 [INT_B] | [INT]) Output (Bridge communication controller) NAPT (SNAT, 172.16.1.10 [MFP_B]) NAPT (DNAT, 172.16.10.11 [SV_B1]) Output (First transmitter-and-receiver) |
| Default | ANY | ANY | ANY | ANY | Drop |

In the flow table of the first NAPT communication controller 15, the rule of processing packet for the first NAPT communication controller 15 is described. Just like the bridge communication controller 14 as described above, the first NAPT communication controller 15 detects the rule of processing packets corresponding to the received packet information by scanning the rule of processing packets in the flow table sequentially from the top using the received packet information. Subsequently, the first NAPT communication controller 15 performs an operation (an action) corresponding to the received packet information indicated by the detected rule of processing packets. After performing the action, the first NAPT communication controller 15 finishes scanning the flow table.

More specifically, in Table 7, as described using "default", the operation indicates that the first NAPT communication controller 15 discards (drops) unintended packet information. In Table 7, as described using "2" and "3", the first NAPT communication controller 15 performs NAPT operation on packet information for Simple Network Management Protocol (SNMP) communication and printing using the printer received from the network group Net_B and transfers the packet information to the bridge communication controller 14. In this case, the first NAPT communication controller 15 restricts source IP address using the access control setting. However, it is unnecessary that the first NAPT communication controller 15 does not restrict the source IP address.

In Table 7, as described using "4", if packet information whose destination is "192.0.2.12:445 (INT_B)" of the first NAPT communication controller 15 is received from the server apparatus SV_B1 in the network group Net_B via the bridge communication controller 14, for example, the first NAPT communication controller 15 performs NAPT operation so that the MFP 1 transfers scanned filed information to the server apparatus SV_B1 and transfers the packet information to the first transmitter-and-receiver 11.

In performing NAPT operation, the first NAPT communication controller 15 detects a status of a Transmission Control Protocol (TCP) session and does not accept packets whose status is in the middle of the TCP session regarding the session that has not started yet. If the TCP session has not started yet, by accepting handshake for establishing the TCP session, the first NAPT communication controller 15 prevents unintended packet such as attack from being transferred.

Next, Table 8 described below describes the flow table stored in the communication routing control information storing unit 37 included in the second NAPT communication controller 16.

TABLE 8

| | In port | Type | Source (src) | Destination (dst) | Action |
|---|---|---|---|---|---|
| 1 | First transmitter-and-receiver | IP | 192.0.2.0/24 | ANY | Drop |
| 2 | First transmitter-and-receiver | IP | ANY | 10.0.1.10: 161 [MFP_C] | NAPT (SNAT, 192.0.2.13 [INT_C]) NAPT (DNAT, 192.0.2.10: 161 [INT]) Output (Bridge communication controller) |
| 3 | First transmitter-and-receiver | IP | ANY | 10.0.1.10: 9100 [MFP_C] | NAPT (SNAT, 192.0.2.13 [INT_C]) NAPT (DNAT, 192.0.2.10: 9100 [INT]) Output (Bridge communication controller) |
| 4 | Bridge communication controller | IP | 192.0.2.201 [INT_SV_C1] | 192.0.2.13: 445 [INT_C] | NAPT (SNAT, 10.0.1.10 [MFP_C]) NAPT (DNAT, 10.0.10.10 [SV_C1]) Output (Second transmitter-and-receiver) |
| Default | ANY | ANY | ANY | ANY | Drop |

In the flow table of the second NAPT communication controller 16, the rule of processing packet for the second NAPT communication controller 16 is described. Just like the bridge communication controller 14 as described above, the second NAPT communication controller 16 detects the rule of processing packets corresponding to the received packet information by scanning the rule of processing packets in the flow table sequentially from the top using the received packet information. Subsequently, the first NAPT communication controller 15 performs an operation (an action) corresponding to the received packet information indicated by the detected rule of processing packets. After performing the action, the second NAPT communication controller 16 finishes scanning the flow table.

More specifically, in Table 8, as described using "default", the operation indicates that the second NAPT communication controller 16 discards (drops) internal communication or unintended packet information. In Table 8, as described using "2" and "3", the first NAPT communication controller 15 performs NAPT operation on packet information for Simple Network Management Protocol (SNMP) communication and printing using the printer received from the network group Net_C and transfers the packet information to the bridge communication controller 14. In this case, the second NAPT communication controller 16 restricts source IP address using the access control setting. However, it is unnecessary that the first NAPT communication controller 15 does not restrict the source IP address.

In Table 8, as described using "4", if packet information whose destination is "192.0.2.13:445 (INT_C)" of the second NAPT communication controller 16 is received from the server apparatus SV_C1 in the network group Net_C via the bridge communication controller 14, for example, the second NAPT communication controller 16 performs NAPT operation so that the MFP 1 transfers scanned filed information to the server apparatus SV_C1 and transfers the packet information to the first transmitter-and-receiver 11.

In performing NAPT operation, the second NAPT communication controller 16 detects a status of a Transmission Control Protocol (TCP) session and accepts packets whose status is in the middle of the TCP session regarding the session that has not started yet. If the TCP session has not started yet, by accepting handshake for establishing the TCP session, the second NAPT communication controller 16 prevents unintended packet such as attack from being transferred.

Table 9 describes an example of a flow table stored in the storing unit such as the ROM and RAM etc. in the tag processor 17 as described below. For example, the flow table assumes a trunking operation described in IEEE 802.1Q. In addition, Table 9 simply describes contents of operations.

TABLE 9

| | In port | Action | VLAN ID | Out port |
|---|---|---|---|---|
| 1 | Second transmitter-and-receiver | Remove VLAN ID | 10 | First NAPT communication controller |
| 2 | Second transmitter-and-receiver | Remove VLAN ID | 30 | Second NAPT communication controller |
| 3 | First NAPT communication controller | Add VLAN ID | 10 | Second transmitter-and-receiver |
| 4 | Second NAPT communication controller | Add VLAN ID | 30 | Second transmitter-and-receiver |
| Default | ANY | Drop packet | ANY | N/A |

The flow table of the tag processor 17 describes a rule of processing packet in the tag processor 17. The tag processor 17 detects the rule of processing packets corresponding to the received packet information by scanning the rule of processing packets in the flow table sequentially from the top using the received packet information. Subsequently, the first NAPT communication controller 15 performs an operation (an action) corresponding to the received packet information indicated by the detected rule of processing packets. After performing the action, the tag processor 17 finishes scanning the flow table.

More specifically, in Table 9, as described using "default", the operation indicates that the tag processor 17 discards (drops) unintended packet information. By contrast, in case of receiving packet information whose VLAN tag is "10" via the second transmitter-and-receiver 12, the tag processor 17 removes the VLAN tag "10" and outputs the packet information to the first NAPT communication controller 15. In case of receiving packet information whose VLAN tag is "30" via the second transmitter-and-receiver 12, the tag processor 17 removes the VLAN tag "30" and outputs the packet information to the second NAPT communication controller 16.

In case of receiving packet information from the first NAPT communication controller 15, the tag processor 17 adds a VLAN tag "10" to the received packet information and outputs the packet information to the second transmitter-and-receiver 12. In case of receiving packet information from the second NAPT communication controller 16, the tag processor 17 adds a VLAN tag "30" to the received packet information and outputs the packet information to the second transmitter-and-receiver 12.

Figure 8:
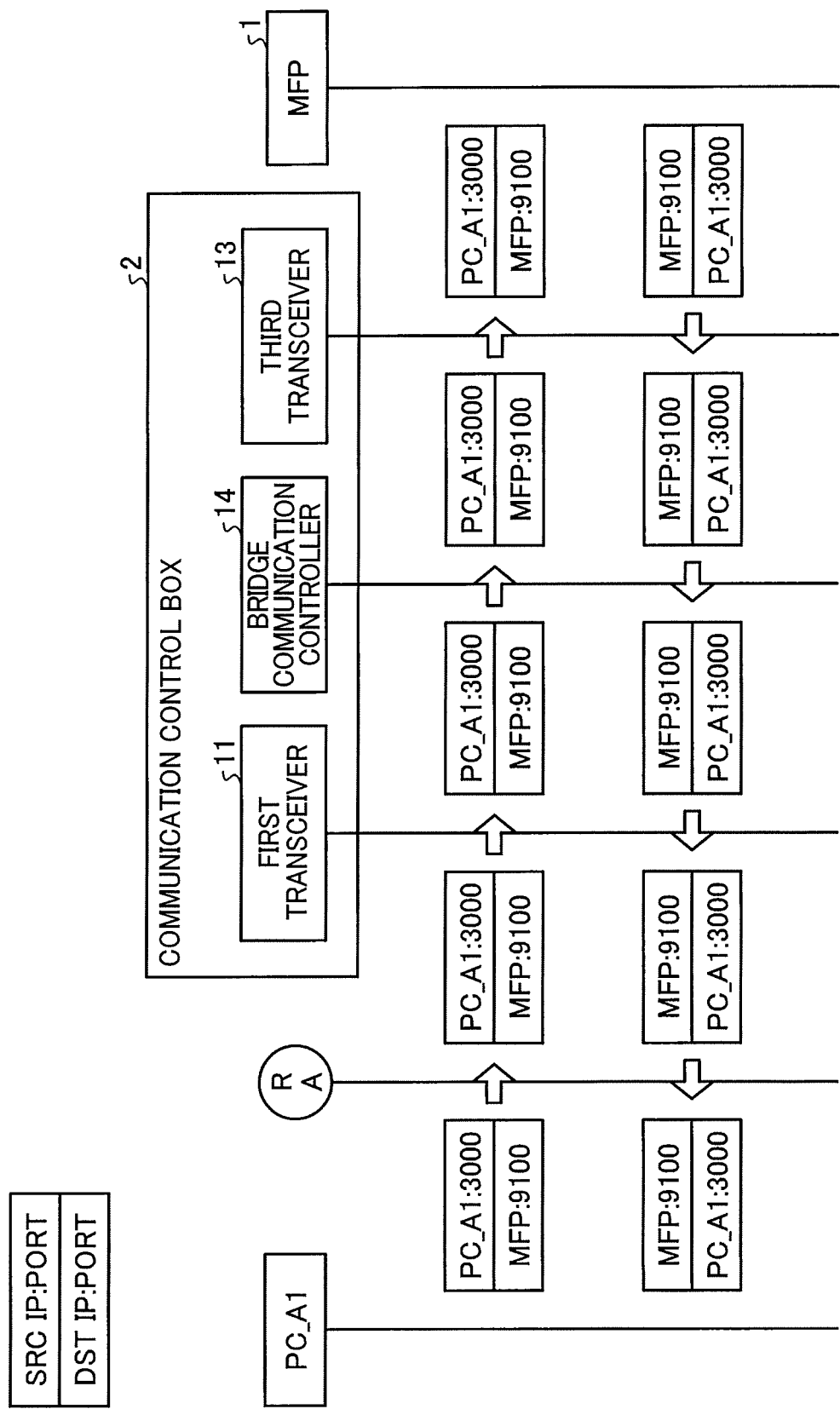
FIG. 8 is a sequence chart illustrating a flow of a packet from a personal computer (PC) in a network group A to a multifunction peripheral (MFP) in printing by the network communication system as an embodiment of the present invention.

FIG. 8 is a sequence chart illustrating a flow of packet information from a PC located in the network group Net_A in FIG. 1 to the MFP 1 in printing data using the MFP 1 in this embodiment. In FIG. 8, a description of packet information "PC_A1:3000" indicates IP address and a port number (communication port number) of the PC PC_A1 as the source (SRC). That is, "PC_A1" indicates IP address of the PC PC_A 1, and "3000" indicates the port number. Similarly, in packet information "MFP:9100", "MFP" indicates IP address of the MFP 1 as the destination (DST), and "9100" indicates the port number.

If the PC PC_A1 located in the network group Net_A transfers packet information to the MFP 1, as illustrated in FIGS. 2 and 8, the packet information is transferred via the bridge communication controller 14 in the communication control box 2. Therefore, as illustrated in FIG. 8, instead of performing NAPT operation etc., the packet information is transferred in the order of the PC PC_A1, the router R_A, the first transmitter-and-receiver 11, the bridge communication controller 14, the third transmitter-and-receiver 13, and the MFP 1.

Similarly, if the MFP 1 transfers packet information to the PC PC_A1 located in the network group Net_A, the packet information is transferred via the bridge communication controller 14 in the communication control box 2. Therefore, as illustrated in FIG. 8, the packet information whose source (SRC) is "MFP:9100" and destination (DST) is "PC_A1: 3000" is transferred in the order of the MFP 1, the third transmitter-and-receiver 13, the bridge communication controller 14, the first transmitter-and-receiver 11, the router R_A in the network group Net_A, and the PC PC_A1. From the viewpoint of packet, the source port of a terminal as a client is modified in accordance with an upper layer such as session layer and application layer etc.

Figure 9:
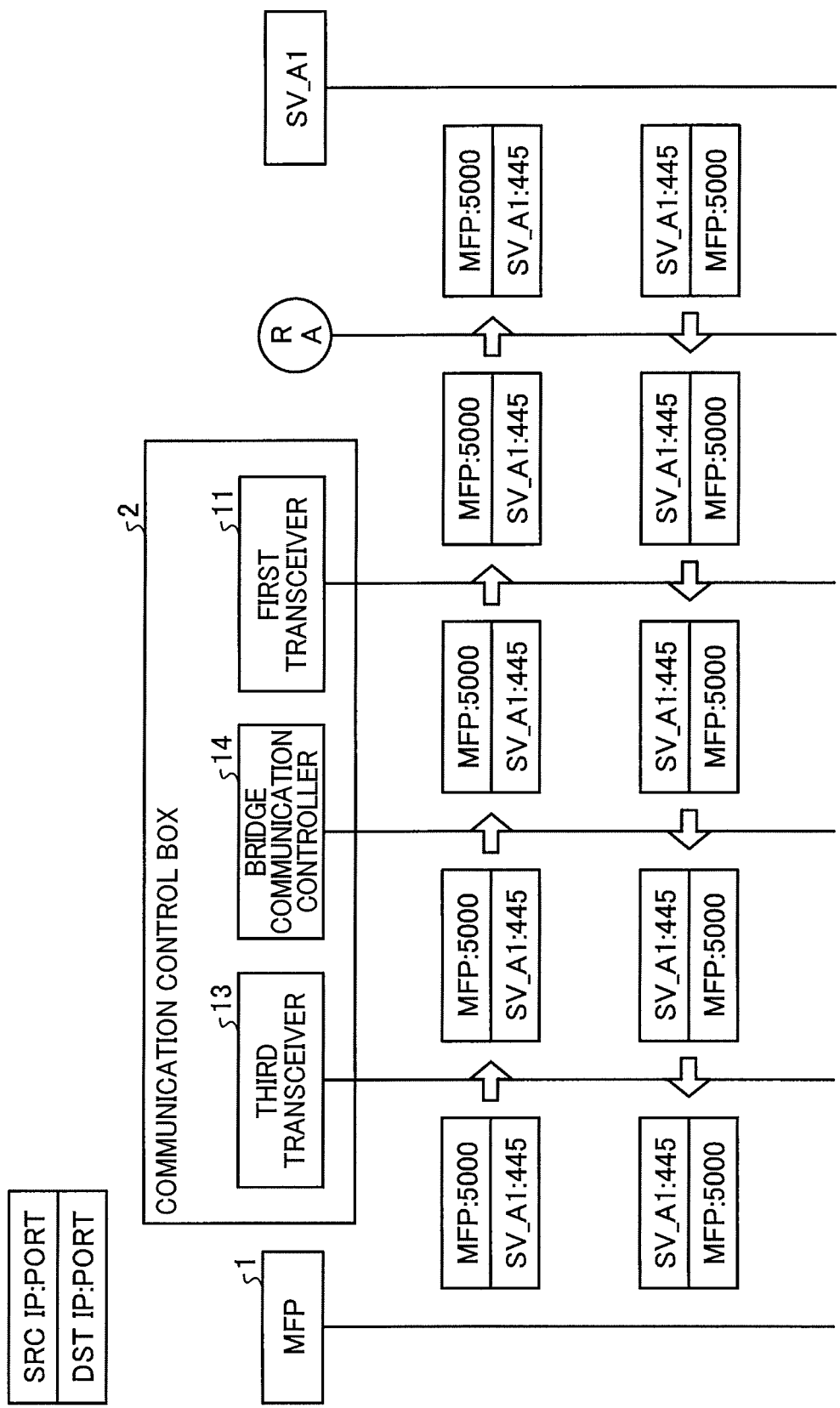
FIG. 9 is a sequence chart illustrating a flow of a packet from the MFP to a server apparatus in the network group A in transferring file information by the network communication system as an embodiment of the present invention.

FIG. 9 is a sequence chart illustrating a flow of file information from the MFP 1 to the server apparatus SV_A1 located in the network group Net_A illustrated in FIG. 1 in this embodiment. As described above, in FIG. 9, file information "MFP:5000" indicates a port number of the MFP 1 as the source (SRC). Similarly, file information "SV_A1: 445" indicates a port number of the server apparatus SV_A1 as the destination (DST).

If the MFP 1 transfers file information to the server apparatus SV_A1 located in the network group Net_A, as illustrated in FIGS. 2 and 9, the file information is transferred via the bridge communication controller 14 in the communication control box 2. Therefore, as illustrated in FIG. 9, instead of performing NAPT operation etc., the file information is transferred in the order of the MFP 1, the third transmitter-and-receiver 13, the bridge communication controller 14, the first transmitter-and-receiver 11, the router R_A, and the server apparatus SV_A1.

Similarly, if the server apparatus SV_A1 transfers file information to the MFP 1, the file information is transferred via the bridge communication controller 14 in the communication control box 2. Therefore, as illustrated in FIG. 9, the file information whose source "SRC" is "SV_A1:445" and destination (DST) is "MFP:5000" is transferred in the order of the server apparatus SV_A1, the router R_A, the first transmitter-and-receiver 11, the bridge communication controller 14, the third transmitter-and-receiver 13, and the MFP 1. From the viewpoint of packet, the source port of a terminal as a client is modified in accordance with an upper layer such as session layer and application layer etc.

That is, as illustrated in the sequence charts in FIGS. 8 and 9, the packet information and file information is transferred to the network group Net_A and received from the network group Net_A instead of performing conversion by performing NAPT operation.

Figure 10:
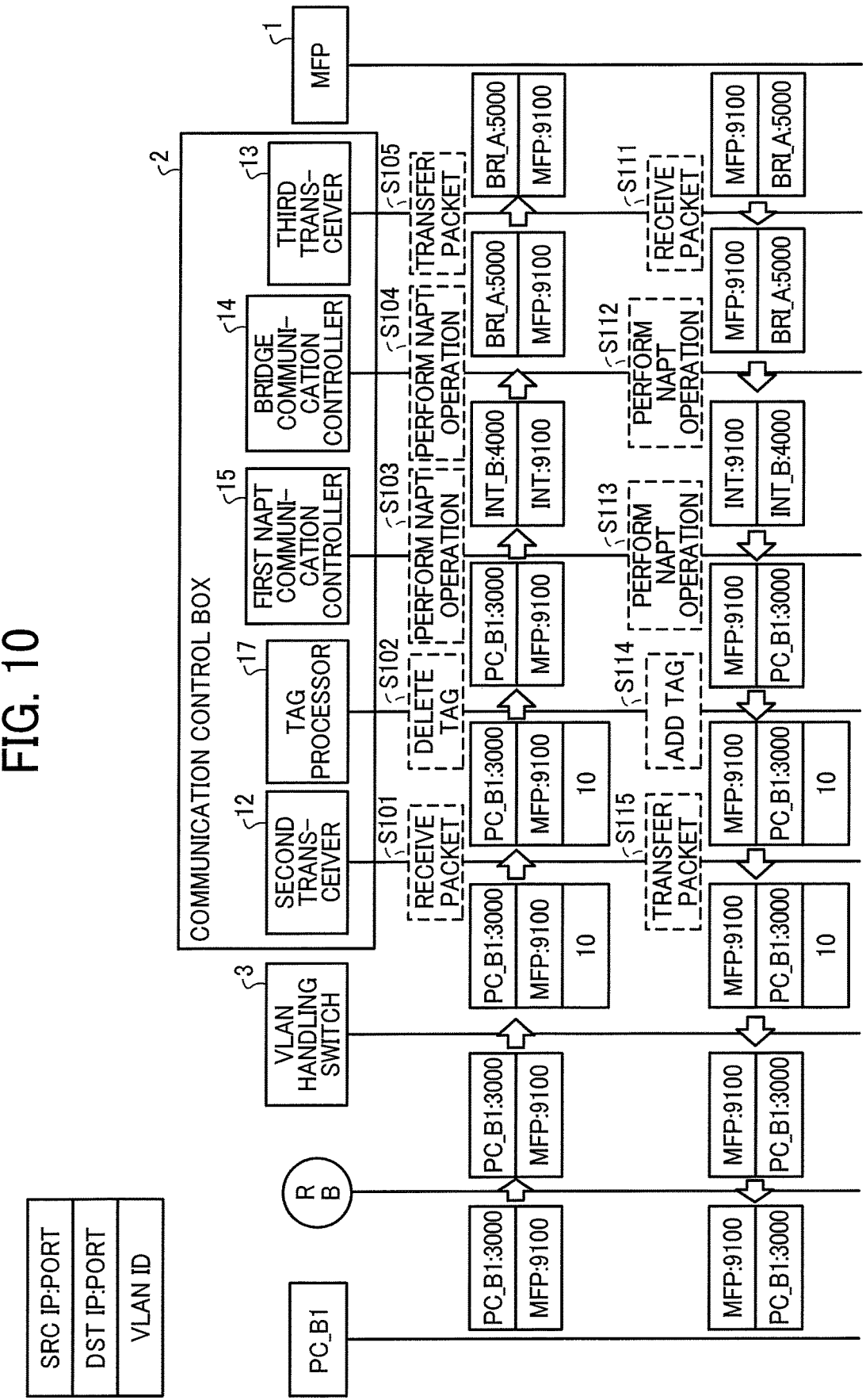
FIG. 10 is a sequence chart illustrating a flow of a packet from the PC in a network group B to the MFP in printing by the network communication system as an embodiment of the present invention.

FIG. 10 is a sequence chart illustrating a flow of packet information from the PC PC_B1 located in the network group Net_B in FIG. 1 to the MFP 1 in printing data using the MFP 1 in this embodiment. In FIG. 10, a description of packet information "PC_B1:3000" indicates IP address and a port number of the PC PC_B1 as the source (SRC) too as described above. Similarly, packet information "MFP:9100" indicates IP address and port number of the MFP 1 as the destination (DST).

If the PC PC_B1 located in the network group Net_B transfers packet information to the MFP 1, as illustrated in FIGS. 2 and 10, the packet information is transferred via the VLAN handling switch 3, the tag processor 17 in the communication control box 2, the first NAPT communication controller 15 in the communication control box 2, and the bridge communication controller 14 in the communication control box 2. Therefore, as illustrated in FIG. 10, the packet information is transferred in the order of the PC PC_B1, the router R_B, the VLAN handling switch 3, the second transmitter-and-receiver 12 (that receives the packet information in S101), the tag processor 17 (that deletes the VLAN tag in S102), the first NAPT communication controller 15 (that performs NAPT operation in S103), the bridge communication controller 14 (that performs NAPT operation in S104), the third transmitter-and-receiver 13 (that transfers the packet information in S106), and the MFP 1.

The VLAN handling switch 3 adds the VLAN tag "10" to the packet information transferred to the communication control box 2. In case of receiving the packet information including the VLAN tag, the tag processor 17 removes the VLAN tag (i.e., the VLAN tag "10" in this case) from the packet information and transfers the packet information to the first NAPT communication controller 15.

Just like the operation of "3" in Table 7 described before, in transferring packet information to the bridge communication controller 14, the first NAPT communication controller 15 performs NAPT operation on packet information whose source is "PC_B1:3000" and destination is "MFP:9100" so that the source is set to "INT_B:4000" using the flow table for the first NAPT communication controller 15 and transfers the packet information to the bridge communication controller 14.

Here, the reason why the source IP address is converted into "INT_B" is to distinguish packet information returned to the source (i.e., the server apparatus PC_B1 in this case) from IP address INT_C of the second NAPT communication controller 16. (That is, the packet information from IP address INT_B returns to IP address INT_B, and the packet information from IP address INT_C returns to IP address INT_C.)

Just like the operation of "5" in Table 6 described before, in transferring packet information to the third transmitter-and-receiver 13, the bridge communication controller 14 performs NAPT operation on packet information whose source is "INT_B:4000" so that the source is set to "BRI_A:5000" using the flow table for the bridge communication controller 14 and transfers the packet information to the third transmitter-and-receiver 13. As a result, the packet information from the PC PC_B1 located in the network group Net_B is transferred to the MFP 1.

By performing NAPT operation so that IP address "INT_B:4000" used within the communication control box 2 is converted into IP address "BRI_A:5000" that is used outside the communication control box 2, it is possible to prevent inconvenience that IP address such as "INT_B" etc. used within the communication control box 2 from being used externally.

In addition, the bridge communication controller 14 converts the source MAC address into MAC address of the router R_A located in the network group Net_A. As a result, the MFP 1 recognizes that packet information is transferred from the router R_A as the default gateway. Consequently, it is possible to handle the network as if the PC PC_B1 in the network group Net_B would be located ahead of the router R_A.

By contrast, if the MFP 1 transfers packet information to the PC PC_B1 located in the network group Net_B (i.e., a return route), as illustrated in FIGS. 2 and 10, the packet information is transferred via the bridge communication controller 14 in the communication control box 2, the first NAPT communication controller 15 in the communication control box 2, the tag processor 17 in the communication control box 2, and the VLAN handling switch 3. Therefore, as illustrated in FIG. 10, the packet information is transferred in the order of the MFP 1, the third transmitter-and-receiver 13 (that receives the packet information in S111), the bridge communication controller 14 (that performs NAPT operation in S112), the first NAPT communication controller 15 (that performs NAPT operation in S113), the tag processor 17 (that adds the VLAN tag in S114), the second transmitter-and-receiver 12 (that transfers the packet information in S115), the VLAN handling switch 3, the router R_B, and the PC PC_B1.

Just like the operation of "6" in Table 6 described before, in transferring packet information to the first NAPT communication controller 15, the bridge communication controller 14 performs NAPT operation on packet information whose source is "MFP:9100" and destination is "BRI_A:5000" so that the source is set to "INT:9100" and the destination is set to "INT_B:4000" using the flow table for the bridge communication controller 14 and transfers the packet information to the first NAPT communication controller 15.

Just like the operation of "4" in Table 7 described before, in transferring packet information to the tag processor 17, the first NAPT communication controller 15 performs NAPT operation on packet information whose source is "TNT:9100" and destination is "INT_B:4000" so that the source is set to "MFP:9100" and the destination is set to "PC_B1:3000" using the flow table for the first NAPT communication controller 15 and transfers the packet information to the tag processor 17.

Just like the operation of "3" in Table 9 described before, in order to transfer the packet information to the VLAN handling switch 3 via the second transmitter-and-receiver 12, the tag processor 17 adds the VLAN tag "10" to the packet information whose source is "MFP:9100" and destination is "PC_B1:3000" using the flow table for the tag processor 17 and transfers the packet information to the second transmitter-and-receiver 12.

By removing the VLAN tag "10" from the packet information received via the second transmitter-and-receiver 12, the VLAN handling switch 3 generates packet information whose source is "MFP:9100" and destination is "PC_B1:3000" and transfers the packet information to the PC PC_B1 via the router R_B. As a result, the packet information from the MFP 1 is transferred to the PC PC_B1 located in the network group Net_B.

Figure 11:
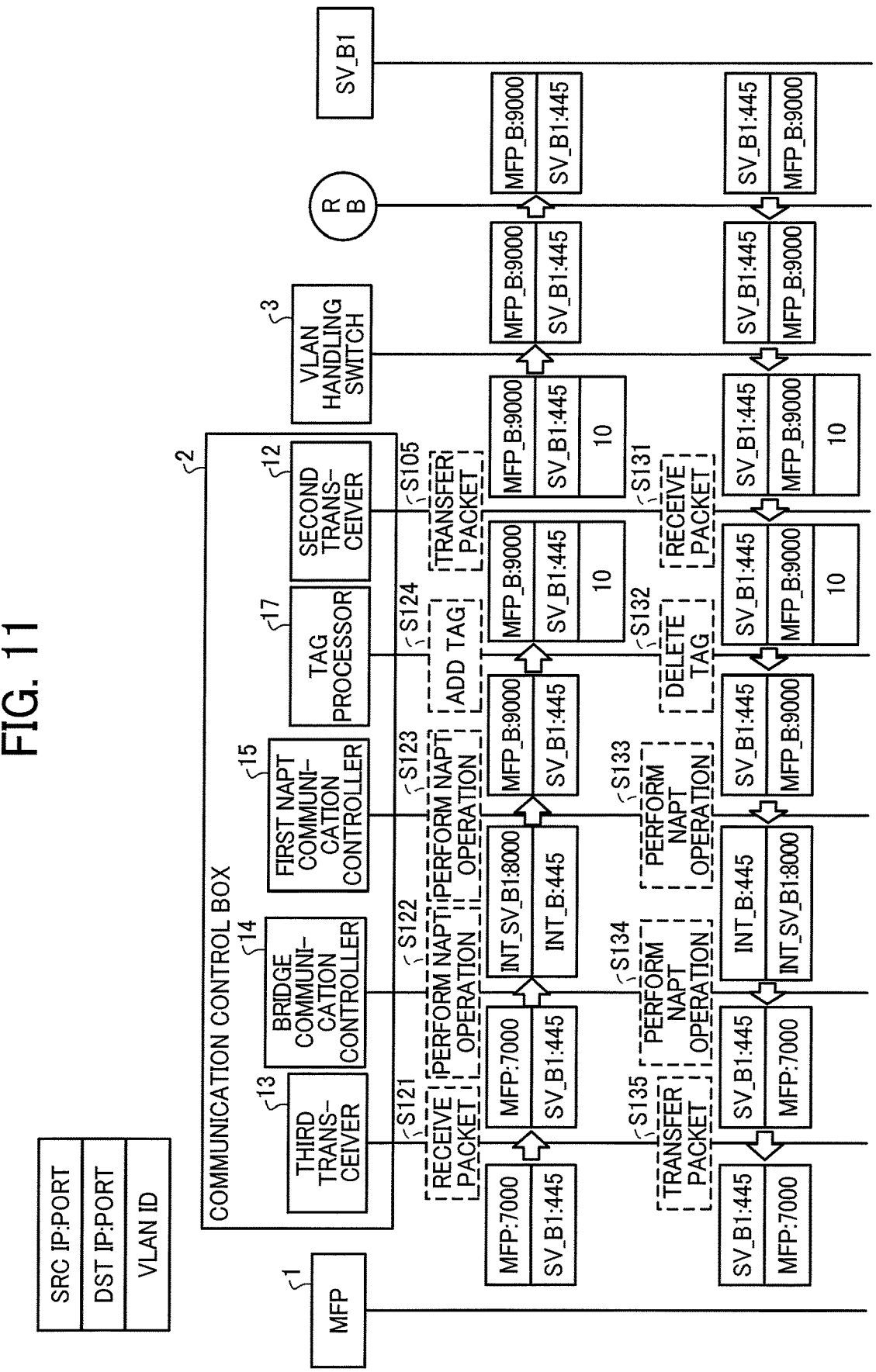
FIG. 11 is a sequence chart illustrating a flow of a packet from the MFP to the server apparatus in the network group B in transferring a file by the network communication system as an embodiment of the present invention.

FIG. 11 is a sequence chart illustrating a flow of file information from the MFP 1 to the server apparatus SV_B1 located in the network group Net_B illustrated in FIG. 1 in this embodiment. As described above, in FIG. 11, file information "MFP:7000" indicates IP address and a port number of the MFP 1 as the source (SRC). Similarly, a description of file information "SV_B1:445" indicates IP address and port number of the server apparatus SV_B1 as the destination (DST).

If the MFP 1 transfers file information to the server apparatus SV_B1 located in the network group Net_B, as illustrated in FIGS. 2 and 11, the file information is transferred via the bridge communication controller 14, the first NAPT communication controller 15, and the tag processor 17 in the communication control box 2 and the VLAN handling switch 3. Therefore, as illustrated in FIG. 11, the file information is transferred in the order of the MFP 1, the third transmitter-and-receiver 13 (that receives the packet information in S121), the bridge communication controller 14 (that performs NAPT operation in S122), the first NAPT communication controller 15 (that performs NAPT operation in S123), the tag processor 17 (that adds the VLAN tag in S124), the second transmitter-and-receiver 12 (that transfers the packet information in S125), the VLAN handling switch 3, the router R_B, and the server apparatus SV_B1.

Just like the operation of "6" in Table 6 described before, in transferring file information to the first NAPT communication controller 15, the bridge communication controller 14 performs NAPT operation on file information received from the third transmitter-and-receiver 13 whose source is "MFP:7000" and destination is "SV_B1:445" so that the source is set to "INT_SV_B1:8000" and the destination is set to "INT_B:445" using the flow table for the bridge communication controller 14 and transfers the file information to the first NAPT communication controller 15. As a result, IP address of the file information is converted into IP address used within the communication control box 2.

In transferring the file information to the tag processor 17, the first NAPT communication controller 15 converts IP addresses "INT_SV_B1:8000" and "INT_B:445" used inside the communication control box 2 into IP addresses "MFP_B:9000" and "SV_B1:445" used outside the communication control box 2 and transfers the file information to the tag processor 17.

Just like the operation of "3" in Table 9 described before, in order to transfer the file information to the VLAN handling switch 3 via the second transmitter-and-receiver 12, the tag processor 17 adds the VLAN tag "10" to the file information whose source is "MFP:9100" and destination is "PC_B1:3000" using the flow table for the tag processor 17 and transfers the packet information to the second transmitter-and-receiver 12. The VLAN handling switch 3 removes the VLAN tag "10" from the file information received via the second transmitter-and-receiver 12 and transfers the file information to the server apparatus SV_B1 via the router R_B.

The first NAPT communication controller 15 performs NAPT operation to change the source IP address "INT_SV_B1:8000" into "MFP_B" and change the destination IP address "INT_B:445" into "SV_B1:445". As a result, the server apparatus SV_B1 in the network group Net_B recognizes the file information as if the file information would be transferred from the MFP in the network group Net_B.

By performing NAPT operation so that IP addresses "INT_SV_B1:8000" and "INT_B:445" used within the communication control box 2 is converted into IP addresses "MFP_B:9000" and "SV_B1:445", it is possible to prevent inconvenience that IP address such as "INT_SV_B1:8000" etc. used within the communication control box 2 from being used externally.

Next, if the server apparatus SV_B1 located in the network group Net_B transfers file information to the MFP 1, as illustrated in FIGS. 2 and 11, the file information is transferred in the order of the server apparatus SV_B1, the router R_B, the VLAN handling switch 3, the second transmitter-and-receiver 12 (that receives the packet information in S131), the tag processor 17 (that deletes the VLAN tag in S132), the first NAPT communication controller 15 (that performs NAPT operation in S133), the bridge communication controller 14 (that performs NAPT operation in S134), the third transmitter-and-receiver 13 (that transfers the packet information in S135), and the MFP 1.

The VLAN handling switch 3 adds the VLAN tag "10" indicating that the file information is received from the network group Net_B to the file information whose source is "SV_B1:445" and destination is "MFP_B:9000" and transfers the file information to the second transmitter-and-receiver 12.

The tag processor 17 removes the VLAN tag "10" from the received file information and transfers the file information to the first NAPT communication controller 15. In transferring the file information to the bridge communication controller 14, the first NAPT communication controller 15 performs NAPT operation to convert the source IP address "MFP_B:9000" and the destination IP address "SV_B1:445" into IP addresses "INT_SV_B1:8000" and "INT_B:445" used inside the communication control box 2 respectively.

In transferring the file information to the third transmitter-and-receiver 13, the bridge communication controller 14 performs NAPT operation to convert IP addresses "INT_B:445" and "INT_SV_B1:8000" performed NAPT operation to be used inside the communication control box 2 into IP addresses "SV_B1:445" and "MFP:7000" used outside the communication control box 2. As a result, the file information whose IP address is used outside the communication control box 2 is transferred to the MFP 1 via the third transmitter-and-receiver 13.

As described above, the network communication system in this embodiment is connected to multiple networks and includes the communication control box 2 that controls communication between apparatuses such as the server apparatus and the PC etc. located in each network and the MFP 1. The communication control box 2 includes communication controllers such as the bridge communication controller 14, the first NAPT communication controller 15, and the second NAPT communication controller 16 etc. that control communication with the MFP 1 for each network.

Each communication controller includes information processing table (with reference to Tables 6 to 8) dedicated to each communication controller for determining the way transmission-and-reception information is processed. In the information processing table, import interfaces that transmission-and-reception information is imported such as the first transmitter-and-receiver 11, the third transmitter-and-receiver 13, the bridge communication controller 14, and the first NAPT communication controller 15 etc., source IP address and destination IP address of the transmission-and-reception information received by each import interface, and operation performed on the transmission-and-reception information are stored associated with each other.

Each communication controller refers to the information processing table on the basis of MAC address, import interface, source IP address, and destination IP address corresponding to the received transmission-and-reception information and performs an operation corresponding to the received transmission-and-reception information. As a result, it is possible to control communication between the MFP 1 and apparatuses in the network for each network, and it is possible to perform communication between networks beyond the router for each network. Consequently, the network communication system in this embodiment may be used with a large-scale network.

Since the dedicated information processing table is located for the communication controller in each network respectively, it is possible to modify the operation for transmission-and-reception information using a predetermined information processing rule, and it is possible to control transmission-and-reception information circumstantially.

In performing NAPT operation, for example, restriction that it is difficult to use normal discovery protocol occurs. However, in the network communication system in this embodiment, the communication controller such as the bridge communication controller 14 etc. may determine whether to convert IP address of the transmission-and-reception information (network address) and transfer the transmission-and-reception information or to transfer the transmission-and-reception information instead of the conversion. As a result, regarding the transmission-and-reception information unnecessary to convert the network address, it is possible to transfer the transmission-and-reception information directly without converting the network address. Consequently, while a part of communication is restricted by performing NAPT operation, communication determined that NAPT operation is not performed is free from the restriction of NAPT operation. In addition, it is unnecessary to modify settings of the communication control box 2 etc. for example.

Since it is possible to control communication on the basis of the source and destination of the transmission-and-reception information, it is possible to control communication using predetermined security policy.

By using port numbers of the transmission-and-reception information such as 80/tcp etc. for controlling communication, since it is possible to control communication using communication protocol, it is possible to control communication using predetermined security policy.

IP address of apparatuses in each network etc. may be configured via a setting screen by user operation. Therefore, it is possible to control communication surely depending on a connection status of the network.

Among routing tables in the bridge communication controller 14, the first NAPT communication controller 15, and the second NAPT communication controller 16, at least one routing table (IP address, netmask, and router address etc.) is configured based on the information provided by the external server apparatus (DHCP). As a result, since it is possible to control the routing tables en bloc, it is possible to operate the communication control box easily.

It is determined whether or not NAPT operation (network address converting operation) is performed in the bridge communication controller 14, the first NAPT communication controller 15, and the second NAPT communication controller 16 on the basis of the condition of the network session. As a result, for example, if unintended communication is started, it is possible to disconnect the communication channel, and it is possible to enhance security of the network communication system in this embodiment.

It is determined whether or not NAPT operation (network address converting operation) is performed in the bridge communication controller 14, the first NAPT communication controller 15, and the second NAPT communication controller 16 on the basis of MAC address of the apparatus as the source. As a result, it is possible to disconnect the communication channel instead of performing network address conversion from the unintended apparatus, and it is possible to enhance security of the network communication system in this embodiment.

The bridge communication controller 14 may control access in the network group Net_A on the bridge side (network group Net_A side). By contrast, in the network groups Net_B and Net_C, the first NAPT communication controller 15 or the second NAPT communication controller 16 performs NAPT operation. Therefore, even in case of setting an access control rule, it is difficult to control the range of controlling access. That is, since IP address is converted, it is difficult to perform control using the source IP address. However, by performing access restriction in accordance with the configured access control rule, even in the network groups Net_B and Net_C (NAPT side), it is possible to perform access restriction on the basis of the address before converting address.

In the network communication system in this embodiment, the tag processor 17 adds the tag information to the packet information (or the file information) and removes the tag information from the packet information (or the file information). As a result, it is possible to support specific networks (i.e., in FIG. 1, for example, the network groups Net_B and Net_C) that transfer/receive packet information etc. by adding tag information.

The embodiment described above provides the communication control apparatus that may support tag VLAN and handle transmission-and-reception information. In addition, the embodiment described above provides the communication control apparatus that resolve the restriction of communication via the router apparatus located in the connected multiple networks and enables to deal with the larger-scale network.

The embodiment described above provides the communication control apparatus that may prevent, if one image forming apparatus processes packet information transferred via multiple networks, transmission error from occurring in routing control using TCP/IP protocol stack. For example, if there are terminals on different networks but whose IP addresses are the same, packets may be transmitted to a wrong destination, which is not preferable from the viewpoint of security, and the communication control apparatus in the embodiment described above may prevent that problem from occurring.

The present invention also encompasses a communication control method performed by a communication control apparatus. The method includes the steps of controlling communicating transmission-and-reception information between at least one communication apparatus and a network apparatus located in each of multiple networks for each of the multiple networks, acquiring operation determination information corresponding to the transmission-and-reception information from a memory storing the operation determination information for determining a way of processing the transmission-and-reception information, providing, in case of receiving the transmission-and-reception information that tag information is added via a specific network that exchanges the transmission-and-reception information adding the tag information, the transmission-and-reception information to the circuitry that acquires the operation determination information after removing the tag information from the transmission-and-reception information being received, transferring, in case of transferring the transmission-and-reception information via the specific network, the transmission-and-reception information after adding the tag information to the transmission-and-reception information to be transferred, and controlling communication between the communication apparatus and the network apparatus located in the network by performing an operation corresponding to the operation determination information being acquired.

It should be noted that the case that the computer apparatus reads and executes the program code is just one example to implement the functional units in the embodiments described above. In addition, in accordance with instructions by the program code, an operating system (OS) running on the computer apparatus may perform a part of the operations or all operations. Furthermore, the functional units described in the above embodiments may obviously be implemented by performing those operations.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication control apparatus for controlling communication between at least one communication apparatus and a plurality of network apparatuses residing on a plurality of networks, comprising:
    a plurality of communication controllers respectively provided for the plurality of networks, each communication controller including:
        a memory that stores operation determination information to be used for determining processing to be performed on transmission-and-reception information, the transmission-and-reception information to be transmitted or received by the communication controller with respect to other communication controller or one of the plurality of network apparatuses on the plurality of networks; and
        circuitry to acquire the operation determination information in response to receiving the transmission-and-reception information, and to perform an operation corresponding to the acquired operation determination information on the transmission-and-reception information;
    a tag processor to add or remove tag information to or from the transmission-and-reception information,
    wherein, when the transmission-and-reception information added with the tag information is received via one of the plurality of networks requiring the tag information, the tag processor transfers the transmission-and-reception information from which the tag information is removed to one of the plurality of communication controllers, and
    wherein, when the transmission-and-reception information having no tag information is received from one of the plurality of communication controllers, the tag processor transfers the transmission-and-reception information added with the tag information to the one network requiring the tag information,
    wherein the circuitry restricts access from outside by referencing an access control rule, by detecting the access control rule matching a received packet from the outside to perform access control for each packet that is received,
    wherein when the transmission-and-reception information is received from the outside of the communication control apparatus, the circuitry:
    converts a first IP address of the transmission-and-reception information into a second IP address used within the communication control apparatus for communication within the communication control apparatus; and
    converts the second IP address of the transmission-and-reception information back to the first IP address used outside the communication control apparatus for transfer to the outside of the communication control apparatus, wherein the circuitry further determines whether or not to convert the first IP address of the transmission-and-reception information depending on a status of a session, and wherein the status of the session which is used to determine whether or not to convert the IP address of the transmission-and-reception information is a not yet started Transmission Control Protocol (TCP) session, and the IP address of the transmission-and-reception information is not converted when packets are for an ongoing TCP session.

2. The communication control apparatus according to claim 1, wherein the circuitry further determines whether or not to convert the first IP address of the transmission-and-reception information depending on an MAC address of the network apparatus as a source of the information.

3. The communication control apparatus according to claim 1, wherein the circuitry further determines whether or not to convert a network address of the transmission-and-reception information based on the transmission-and-reception information being received.

4. The communication control apparatus according to claim 1, wherein the circuitry acquires the operation determination information corresponding to the transmission-and-reception information being received from the corresponding network apparatus by using at least one of a source IP address and a destination IP address included in the transmission-and-reception information being received.

5. The communication control apparatus according to claim 1, wherein the transmission-and-reception information includes a communication port number.

6. The communication control apparatus according to claim 1, wherein the transmission-and-reception information includes a network interface that inputs the transmission-and-reception information.

7. The communication control apparatus according to claim 1, wherein the circuitry configures the operation determination information stored in the memory based on information provided via an external apparatus.

8. A non-transitory, computer-readable recording medium storing a program that, when executed by one or more processors of a communication control apparatus, causes the processors to implement a method of controlling communication between at least one communication apparatus and a plurality of network apparatuses residing on a plurality of networks, using a plurality of communication controllers respectively provided for the plurality of networks, the method comprising:

storing, in a memory of each communication controller, operation determination information to be used for determining processing to be performed on transmission-and-reception information, the transmission-and-reception information to be transmitted or received by the communication controller with respect to other communication controller or one of the plurality of network apparatuses on the plurality of networks;

receiving, with the communication controller, transmission-and-reception information;

acquiring, with the communication controller, the operation determination information that corresponds to the transmission-and-reception information being received from the memory; and performing, with the communication controller, an operation corresponding to the acquired operation determination information on the transmission-and-reception information, the method further comprising restricting access from outside by referencing an access control rule, by detecting the access control rule matching a received packet from the outside to perform access control for each packet that is received, wherein when the transmission-and-reception information is received from the outside of the communication control apparatus, the method further performs:

converting a first IP address of the transmission-and-reception information into a second IP address used within the communication control apparatus for communication within the communication control apparatus; and converting the second IP address of the transmission-and-reception information back to the first IP address used outside the communication control apparatus for transfer to the outside of the communication control apparatus, wherein the method further comprises determining whether or not to convert the first IP address of the transmission-and-reception information depending on a status of a session, and wherein the status of the session which is used to determine whether or not to convert the IP address of the transmission-and-reception information is a not yet started Transmission Control Protocol (TCP) session, and the IP address of the transmission-and-reception information is not converted when packets are for an ongoing TCP session.

9. A network communication system, comprising:

at least one communication apparatus;

a plurality of network apparatuses that respectively reside on a plurality of networks; and a communication control apparatus to control communication between the communication apparatus and the network apparatuses, wherein the communication control apparatus comprises:

a plurality of communication controllers respectively provided for the plurality of networks, each communication controller including:

a memory that stores operation determination information to be used for determining processing to be performed on transmission-and-reception information, the transmission-and-reception information to be transmitted or received by the communication controller with respect to other communication controller or one of the plurality of network apparatuses on the plurality of networks; and circuitry to acquire the operation determination information in response to receiving the transmission-and-reception information, and to perform an operation corresponding to the acquired operation determination information on the transmission-and-reception information;

a tag processor to add or remove tag information to or from the transmission-and-reception information, wherein, when the transmission-and-reception information added with the tag information is received via one of the plurality of networks requiring the tag information, the tag processor transfers the transmission-and-reception information from which the tag information is removed to one of the plurality of communication controllers, and wherein, when the transmission-and-reception information having no tag information is received from one of the plurality of communication controllers, the tag processor transfers the transmission-and-reception information added with the tag information to the one network requiring the tag information, wherein the circuitry restricts access from outside by referencing an access control rule, by detecting the access control rule matching a received packet from the outside to perform access control for each packet that is received, wherein when the transmission-and-reception information is received from the outside of the communication control apparatus, the circuitry:

converts a first IP address of the transmission-and-reception information into a second IP address used within the communication control apparatus for communication within the communication control apparatus; and converts the second IP address of the transmission-and-reception information back to the first IP address used outside the communication control apparatus for transfer to the outside of the communication control apparatus, wherein the circuitry further determines whether or not to convert the first IP address of the transmission-and-reception information depending on a status of a session, and wherein the status of the session which is used to determine whether or not to convert the IP address of the transmission-and-reception information is a not yet started Transmission Control Protocol (TCP) session, and the IP address of the transmission-and-reception information is not converted when packets are for an ongoing TCP session.

* * * * *